US010721720B2

(12) United States Patent
Damnjanovic et al.

(10) Patent No.: US 10,721,720 B2
(45) Date of Patent: *Jul. 21, 2020

(54) CELL ON-OFF PROCEDURE FOR DUAL CONNECTIVITY

(71) Applicant: QUALCOMM Incorporated, San Diego, CA (US)

(72) Inventors: Aleksandar Damnjanovic, Del Mar, CA (US); Jelena Damnjanovic, Del Mar, CA (US); Peter Gaal, San Diego, CA (US); Wanshi Chen, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,592

(22) Filed: Jan. 6, 2015

(65) Prior Publication Data

US 2015/0215929 A1   Jul. 30, 2015

Related U.S. Application Data

(60) Provisional application No. 61/933,822, filed on Jan. 30, 2014.

(51) Int. Cl.
*H04W 72/04* (2009.01)
*H04L 5/00* (2006.01)
(Continued)

(52) U.S. Cl.
CPC ......... *H04W 72/0413* (2013.01); *H04L 5/001* (2013.01); *H04L 5/0032* (2013.01);
(Continued)

(58) Field of Classification Search
CPC .......... H04W 72/0413; H04W 52/0206; H04L 5/0032; H04L 5/0098
See application file for complete search history.

(56) References Cited

U.S. PATENT DOCUMENTS

2009/0095513 A1   4/2009  Oshika et al.
2010/0056184 A1*  3/2010  Vakil ................. H04W 4/02
                                                    455/456.5
(Continued)

FOREIGN PATENT DOCUMENTS

CN    102378238 A    3/2012
CN    102624494 A    8/2012
(Continued)

OTHER PUBLICATIONS

U.S. Appl. No. 61/921,016, filed Dec. 2013, Ng, Boon Loong.*
(Continued)

*Primary Examiner* — Jael M Ulysse
(74) *Attorney, Agent, or Firm* — Holland & Hart LLP

(57) ABSTRACT

Dynamic cell mode indication and reporting channel state information for dormant cells in a dual connectivity carrier aggregation environment. UEs may be configured for carrier aggregation of cells associated with non-collocated eNBs, which may include a master eNB (MeNB) and one or more secondary eNBs (SeNB), each supporting multiple carrier frequencies. Indicators of cell mode for secondary cells of the MeNB or SeNB are periodically sent using a broadcast mechanism and may configure active or dormant sub-periods within the indicated periods. The indicators may be transmitted by a primary cell for the MeNB or special secondary cell for the SeNB. Alternatively, the indicators may be transmitted by the secondary cell. When CSI measurements occur for a dormant cell, the UE may report CSI for the dormant periods, suppress CSI reporting for the dormant periods, or report some types of CSI and not others for the dormant periods.

23 Claims, 18 Drawing Sheets

(51) Int. Cl.
*H04W 52/02* (2009.01)
*H04W 24/10* (2009.01)
*H04W 48/16* (2009.01)
*H04L 27/26* (2006.01)
*H04W 56/00* (2009.01)

(52) U.S. Cl.
CPC ............ *H04L 5/0098* (2013.01); *H04L 27/26* (2013.01); *H04W 24/10* (2013.01); *H04W 48/16* (2013.01); *H04W 52/0206* (2013.01); *H04W 56/001* (2013.01); *H04W 72/042* (2013.01); *H04W 72/0446* (2013.01); *H04L 5/0053* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01)

(56) References Cited

U.S. PATENT DOCUMENTS

| | | | |
|---|---|---|---|
| 2011/0116467 A1 | 5/2011 | Jung et al. | |
| 2011/0128901 A1* | 6/2011 | Lee | H04L 27/2608 370/311 |
| 2011/0170466 A1* | 7/2011 | Kwun | H04W 52/0235 370/311 |
| 2011/0190017 A1 | 8/2011 | Kwon et al. | |
| 2011/0194493 A1* | 8/2011 | Centonza | H04W 52/0235 370/328 |
| 2011/0205976 A1 | 8/2011 | Roessel et al. | |
| 2011/0244870 A1* | 10/2011 | Lee | H04W 52/244 455/444 |
| 2011/0268087 A1 | 11/2011 | Kwon et al. | |
| 2011/0269490 A1* | 11/2011 | Earnshaw | H04L 1/0026 455/509 |
| 2011/0312316 A1* | 12/2011 | Baldemair | H04L 5/001 455/422.1 |
| 2012/0028674 A1* | 2/2012 | Zhao | H04W 24/02 455/522 |
| 2012/0093103 A1* | 4/2012 | Lee | H04L 5/0053 370/329 |
| 2012/0176884 A1* | 7/2012 | Zhang | H04B 7/024 370/203 |
| 2012/0176926 A1* | 7/2012 | Jang | H04W 24/02 370/252 |
| 2012/0224470 A1* | 9/2012 | Jeong | H04W 36/08 370/221 |
| 2012/0250578 A1* | 10/2012 | Pani | H04W 48/12 370/254 |
| 2012/0275398 A1* | 11/2012 | Chen | H04W 24/10 370/329 |
| 2012/0281544 A1* | 11/2012 | Anepu | H04B 7/0632 370/241 |
| 2012/0282942 A1* | 11/2012 | Uusitalo | H04W 16/14 455/452.2 |
| 2013/0010964 A1* | 1/2013 | Fong | H04L 5/0053 380/277 |
| 2013/0022014 A1 | 1/2013 | Hong et al. | |
| 2013/0077523 A1* | 3/2013 | Ko | H04W 24/00 370/252 |
| 2013/0107743 A1* | 5/2013 | Ishii | H04L 5/001 370/252 |
| 2013/0121185 A1* | 5/2013 | Li | H04W 72/046 370/252 |
| 2013/0148534 A1* | 6/2013 | Jung | H04W 24/02 370/252 |
| 2013/0148535 A1* | 6/2013 | Baghel | H04L 1/0026 370/252 |
| 2013/0148613 A1* | 6/2013 | Han | H04L 1/0026 370/329 |
| 2013/0176952 A1* | 7/2013 | Shin | H04L 5/001 370/329 |
| 2013/0235738 A1* | 9/2013 | Siomina | H04W 24/00 370/252 |
| 2013/0235778 A1* | 9/2013 | Maeder | H04W 52/0206 370/311 |
| 2013/0237208 A1* | 9/2013 | Vujcic | H04B 7/15507 455/418 |
| 2013/0250881 A1* | 9/2013 | Liao | H04W 36/08 370/329 |
| 2013/0250908 A1* | 9/2013 | Bach | H04W 52/0206 370/331 |
| 2013/0310048 A1* | 11/2013 | Hunukumbure | H04W 52/0206 455/443 |
| 2013/0329691 A1* | 12/2013 | Kim | H04L 5/001 370/329 |
| 2014/0003269 A1* | 1/2014 | Golitschek Edler von Elbwart | H04L 5/003 370/252 |
| 2014/0010131 A1 | 1/2014 | Gaal et al. | |
| 2014/0086173 A1* | 3/2014 | Sadeghi | H04L 5/005 370/329 |
| 2014/0092761 A1* | 4/2014 | Behravan | H04W 24/02 370/252 |
| 2014/0105056 A1* | 4/2014 | Li | H04W 24/02 370/252 |
| 2014/0177557 A1* | 6/2014 | Charbit | H04W 24/10 370/329 |
| 2014/0185467 A1* | 7/2014 | Heo | H04W 76/15 370/252 |
| 2014/0192740 A1* | 7/2014 | Ekpenyong | H04L 5/0035 370/329 |
| 2014/0192775 A1* | 7/2014 | Li | H04W 74/006 370/331 |
| 2014/0301301 A1* | 10/2014 | Cheng | H04L 5/0073 370/329 |
| 2015/0049649 A1* | 2/2015 | Zhu | H04W 24/02 370/277 |
| 2015/0099503 A1* | 4/2015 | Kuo | H04W 72/10 455/418 |
| 2015/0189574 A1* | 7/2015 | Ng | H04W 24/08 370/252 |
| 2015/0208269 A1* | 7/2015 | Damnjanovic | H04L 1/0026 370/252 |
| 2015/0373629 A1* | 12/2015 | Zeng | H04W 48/16 370/328 |

FOREIGN PATENT DOCUMENTS

| | | |
|---|---|---|
| CN | 103299565 A | 9/2013 |
| EP | 2747492 A2 | 6/2014 |
| JP | 2014082733 A | 5/2014 |
| JP | 2015513874 A | 5/2015 |
| JP | 2015537456 A | 12/2015 |
| WO | WO-2011053856 A2 | 5/2011 |
| WO | WO-2012024181 A1 | 2/2012 |
| WO | Wo-2012095147 A1 | 7/2012 |
| WO | WO-2012096502 A2 | 7/2012 |
| WO | WO-2012149898 A1 | 11/2012 |
| WO | WO-2013025160 A1 | 2/2013 |
| WO | WO-2013044957 A1 | 4/2013 |
| WO | WO-2013048121 A1 | 4/2013 |
| WO | WO-2013135295 A1 | 9/2013 |
| WO | WO-2013140240 A1 | 9/2013 |
| WO | WO-2014071967 A1 | 5/2014 |

OTHER PUBLICATIONS

U.S. Appl. No. 61/813,062, filed Apr. 2013, Cheng; Qian.*
U.S. Appl. No. 61/808,536, filed Apr. 2013, Cheng, Qian.*
ISA/EPO, International Search Report and Written Opinion of the International Searching Authority, Int'l App. No. PCT/US2015/010415, dated Apr. 20, 2015, European Patent Office, Rijswijk, NL, 11 pgs.
3GPP, "3rd Generation Partnership Project; Technical Specification Group Radio Access Network; Evolved Universal Terrestrial Radio Access (E-UTRA); Medium Access Control (MAC) Protocol Specification (Release 11)", 3GPP Technical Specification, Dec. 2012, 2 pgs, 3GPP TS 36.321 V11.1.0, XP002739843, 3rd Generation Partnership Project.

(56) References Cited

OTHER PUBLICATIONS

3GPP, "3rd Generation Partnership Project; Technical Specification Group Radio Access Network; Small Cell Enhancements for E-UTRA and E-UTRAN—Physical Layer Aspects (Release 12)", 3GPP Technical Report, Aug. 2013, 2 pgs, 3GPP TR 36.872, V1.0.0, XP002739844, 3rd Generation Partnership Project.

Hitachi Ltd, "Discovery Procedures for Small Cell On/Off Switching," 3GPP TSG RAN WG1 Meeting #74bis, R1-134760, Guangzhou, China, Oct. 7-11, 2013, 4 pgs., XP050717810, 3rd Generation Partnership Project.

NTT Docomo, "Small Cell Discovery for Efficient Small Cell On/Off Operation," 3GPP TSG RAN WG1 Meeting #74, R1-133457, Barcelona, Spain, Aug. 19-23, 2013, 8 pgs., XP050716565, 3rd Generation Partnership Project.

Qualcomm Incorporated, "Small Cell On/Off," 3GPP TSG-RAN WG1 Meeting #74bis, R1-134617, Guangzhou, China, Oct. 7-11, 2013, 5 pgs., XP050717702, 3rd Generation Partnership Project.

Fujitsu: "Way Forward on CSI reporting for CA", 3GPP Draft; R1-111940, 3rd Generation Partnership Project (3GPP) Mobile Competence Centre; 650, Route Des Lucioles; F-06921 Sophia-Antipolis Cedex; France. vol. RAN WG1, no. Barcelona. Spain; May 9, 2011, May 16, 2011 (May 16, 2011), XP050491568.

Fujitsu: "Discussion on Discovery and Measurement of Turned-off Small Cells [online]", 3GPP TSG-RAN WG1#74b R1-134257, URL:http://www.3gpp.org/ftp/tsg_ran/WG1_RL1/TSGR1_74b/Docs/R1-134257.zip, Oct. 7, 2013, 5 pages.

ETRI: "Small Cell Discovery and Cell State Transition [online]", 3GPP TSGRAN WG1 #75, R1-135276, URL:http://www.3gpp.org/ftp/tsg_ran/WG1_RL1/TSGR1_75/Docs/R1-135276.zip, Nov. 2, 2013, 4 pages.

ZTE: "Further Considerations on Enhanced Transition Procedures of Small Cell on/off Scheme" [online], 3GPP TSG-RAN WG1 #75, R1-135350, Nov. 11, 2013, 9 Pages, URL:http://www.3gpp.org/ftp/tsg_ran/WG1_RL1/TSGR1_75/Docs/R1-135350.zip.

\* cited by examiner

CELL ON-OFF PROCEDURE FOR DUAL CONNECTIVITY

CROSS REFERENCES

The present application for patent claims priority to U.S. Provisional Patent Application No. 61/933,822 by Damnjanovic et al., entitled "Cell On-Off Procedure for Dual Connectivity," filed Jan. 30, 2014, assigned to the assignee hereof, and expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. In some cases the coverage area may be subdivided into multiple cells. Also, in some cases, a base station may transmit multiple component carriers on different portions of available spectrum. These component carriers may also be referred to as cells.

A UE may be served by more than one carrier. In some cases a UE may be served by multiple carriers transmitted from a single base station, in other cases, a UE may be served by multiple carriers transmitted from more than one base station. When more than one carrier is configured to serve one or more UEs, there may be periods where one or more of the configured carriers may not transmit data to UEs. Continuing to transmit control information or reference signals when a carrier does not have data to transmit to the UEs may result in inefficient use of resources for the base station and for the UEs.

SUMMARY

The described features generally relate to one or more improved systems, methods, or apparatuses for dynamic cell mode indication and reporting channel and interference feedback for dormant cells in a multi-carrier environment. In some embodiments, indicators of cell mode for one or more secondary cells are sent (e.g., periodically or aperiodically) using a transmission mechanism (e.g., broadcast, unicast, multicast, etc.) and may configure active or dormant subperiods within the indicated periods. Indicators of cell mode for a secondary cell may be transmitted on carriers of the primary cell, or the indicators may be transmitted on carriers of the secondary cell, in some cases. Dormancy may also be indicated by the presence or absence of a cell mode indicator.

In some embodiments, a wireless communication device may be configured for dual-connectivity carrier aggregation using carriers from non-collocated base stations. A master cell group associated with a master base station may include a primary cell and one or more secondary cells while a secondary cell group associated with a secondary base station may include one or more secondary carriers, one of which may be a special secondary carrier which may carry an uplink control channel for carriers of the secondary cell group. Cell dormancy may be supported for secondary cells of the secondary cell group using indicators of cell mode broadcast by the special secondary carrier, or broadcast by each of secondary cells of the secondary cell group, in some cases.

Some embodiments are directed to managing channel state information (CSI) reporting for dormant secondary cells. When CSI measurements occur for a carrier associated with a dormant secondary cell, the UE may report CSI for the dormant periods, suppress CSI reporting for the dormant periods, or report some types of CSI and not others for the dormant periods (e.g., report periodic and suppress aperiodic, etc.). Reported CSI may be based on the CSI measurements when the secondary cell was dormant or based on prior CSI measurements made when the secondary cell was active. These techniques may be applied to reporting CSI for secondary carriers of a master cell group or secondary cell group.

A method of wireless communications is described, including monitoring indications of cell dormancy for a multiple carrier configuration, the multiple carrier configuration including a first carrier group and a second carrier group, the first carrier group being associated with a first base station and including a primary carrier only or the primary carrier and a first set of secondary carriers including one or more secondary carriers, and the second carrier group being associated with a second base station and including a second set of secondary carriers including one or more secondary carriers. The method may include determining, based on the monitoring, whether one or more secondary carriers from at least one of the first set of secondary carriers or the second set of secondary carriers are dormant.

An apparatus for wireless communications is described, including means for monitoring indications of cell dormancy for a multiple carrier configuration, the multiple carrier configuration including a first carrier group and a second carrier group, the first carrier group being associated with a first base station and including a primary carrier only or the primary carrier and a first set of secondary carriers including one or more secondary carriers, and the second carrier group being associated with a second base station and including a second set of secondary carriers including one or more secondary carriers. The apparatus may include means for determining, based on the monitoring, whether one or more secondary carriers from at least one of the first set of secondary carriers or the second set of secondary carriers are dormant.

An apparatus for wireless communications is also described, including a processor; a memory in electronic communication with the processor; and instructions stored in the memory, the instructions being executable by the processor to monitor indications of cell dormancy for a multiple carrier configuration, the multiple carrier configuration including a first carrier group and a second carrier group, the first carrier group being associated with a first base station and including a primary carrier only or the primary carrier and a first set of secondary carriers including one or more secondary carriers, and the second carrier group being associated with a second base station and including a second set of secondary carriers including one or more secondary carriers. The memory may include instructions executable by the processor to determine, based on the monitoring, whether one or more secondary carriers from at least one of the first set of secondary carriers or the second set of secondary carriers are dormant.

A computer program product for wireless communications is also described, the computer program product comprising a non-transitory computer-readable medium storing instructions executable by a processor to monitor indications of cell dormancy for a multiple carrier configuration, the multiple carrier configuration including a first carrier group and a second carrier group, the first carrier group being associated with a first base station and including a primary carrier only or the primary carrier and a first set of secondary carriers including one or more secondary carriers, and the second carrier group being associated with a second base station and including a second set of secondary carriers including one or more secondary carriers. The computer-readable medium may include instructions executable by the processor to determine, based on the monitoring, whether one or more secondary carriers from at least one of the first set of secondary carriers or the second set of secondary carriers are dormant.

A method, apparatus and computer program product as above is also described wherein determining comprises determining, based on a received cell mode indicator, that a secondary carrier from at least one of the first set of secondary carriers or the second set of secondary carriers is dormant.

A method, apparatus and computer program product as above is also described wherein determining comprises determining, based on an absence of a cell mode indicator, that a secondary carrier from at least one of the first set of secondary carriers or the second set of secondary carriers is dormant.

A method, apparatus and computer program product as above is also described wherein the monitoring comprises monitoring the primary carrier of the first carrier group for cell mode indicators associated with the one or more secondary carriers from the first set of secondary carriers.

A method, apparatus and computer program product as above is also described wherein the monitoring comprises monitoring the one or more secondary carriers from the first carrier group for cell mode indicators associated with the one or more secondary carriers of the first set of secondary carriers.

A method, apparatus and computer program product as above is also described wherein the second carrier group comprises a special secondary carrier, and wherein the monitoring comprises monitoring the special secondary carrier for cell mode indicators associated with the one or more secondary carriers of the second set of secondary carriers.

A method, apparatus and computer program product as above is also described wherein the second carrier group comprises a special secondary carrier, and wherein the monitoring comprises monitoring the one or more secondary carriers of the second set of secondary carriers for cell mode indicators associated with the one or more secondary carriers of the second set of secondary carriers.

A method, apparatus and computer program product as above is also described wherein the monitoring comprises monitoring one or more search spaces of at least a first carrier of the first carrier group and at least a second carrier of the second carrier group at predefined time intervals for downlink control information (DCI) comprising the indications of cell dormancy.

A method, apparatus and computer program product as above is also described wherein monitoring the indications of cell dormancy for the multiple carrier configuration is based on activation states of secondary carriers of the first and second sets of secondary carriers.

A method, apparatus and computer program product as above is also described further comprising receiving indications of cell dormancy associated with the one or more secondary carriers, and wherein the determining comprises determining the one or more secondary carriers are dormant for a predetermined period of time.

A method, apparatus and computer program product as above is also described further comprising receiving indications of cell dormancy associated with the one or more secondary carriers, and wherein the determining comprises determining the one or more secondary carriers are dormant until a next cell dormancy indication is received.

A method, apparatus and computer program product as above is also described wherein the predetermined time period comprises one or more radio frames.

A method of wireless communications is described, comprising determining that at least one secondary carrier is dormant at a UE operating in a multiple carrier configuration, the multiple carrier configuration comprising a first carrier group and a second carrier group, the first carrier group being associated with a first base station and including a primary carrier only or the primary carrier and a first set of secondary carriers including one or more secondary carriers, and the second carrier group being associated with a second base station and including a second set of secondary carriers including one or more secondary carriers. The method may include determining a channel state information (CSI) reporting configuration for the at least one secondary carrier based at least in part on the determining that the at least one secondary carrier is dormant.

An apparatus for wireless communications is described, comprising means for determining that at least one secondary carrier is dormant for a multiple carrier configuration, the multiple carrier configuration comprising a first carrier group and a second carrier group, the first carrier group being associated with a first base station and including a primary carrier only or the primary carrier and a first set of secondary carriers including one or more secondary carriers, and the second carrier group being associated with a second base station and including a second set of secondary carriers including one or more secondary carriers. The apparatus may include means for determining a CSI reporting configuration for the at least one secondary carrier based at least in part on the determining that the at least one secondary carrier is dormant.

An apparatus for wireless communications is also described, including a processor; a memory in electronic communication with the processor; and instructions stored in the memory, the instructions being executable by the processor to determine that at least one secondary carrier is dormant for a multiple carrier configuration, the multiple carrier configuration comprising a first carrier group and a second carrier group, the first carrier group being associated with a first base station and including a primary carrier only or the primary carrier and a first set of secondary carriers including one or more secondary carriers, and the second carrier group being associated with a second base station and including a second set of secondary carriers including one or more secondary carriers. The memory may include instructions executable by the processor to determine a CSI reporting configuration for the at least one secondary carrier based at least in part on the determining that the at least one secondary carrier is.

A computer program product for wireless communications is also described, the computer program product comprising a non-transitory computer-readable medium storing instructions executable by a processor to determine that at least one secondary carrier is dormant for a multiple carrier configuration, the multiple carrier configuration comprising a first carrier group and a second carrier group, the first carrier group being associated with a first base station and including a primary carrier only or the primary carrier and a first set of secondary carriers including one or more secondary carriers, and the second carrier group being associated with a second base station and including a second set of secondary carriers including one or more secondary carriers. The computer-readable medium may include instructions executable by the processor to determine a CSI reporting configuration for the at least one secondary carrier based at least in part on the determining that the at least one secondary carrier is dormant.

In some embodiments, the method as described above may include the features of determining, whether the at least one secondary carrier is associated with the first base station or the second base station, and performing CSI reporting for the at least one secondary carrier to the first base station or to the second base station based on the determined association and according to the CSI reporting configuration. The described apparatuses and computer program products may include means for, code for, or instructions executable by a processor to perform these features.

A method, apparatus and computer program product as above is also described wherein the CSI reporting configuration comprises suppressing CSI reporting for the at least one secondary carrier for one or more of periodic CSI reporting or aperiodic CSI reporting, or a combination thereof.

A method, apparatus and computer program product as above is also described wherein the CSI reporting configuration comprises reporting CSI based on channel measurements of the at least one secondary carrier during at least one time period when the at least one secondary carrier was non-dormant.

A method, apparatus and computer program product as above is also described wherein the CSI reporting configuration further comprises averaging the channel measurements from the at least one time period.

A method, apparatus and computer program product as above is also described wherein the CSI reporting configuration comprises reporting CSI based on measurements for the at least one secondary carrier.

A method, apparatus and computer program product as above is also described wherein the reported CSI comprises one or more of channel measurements of the at least one secondary carrier, interference measurements of the at least one secondary carrier, or a combination thereof.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, methods, or apparatuses are described for dynamic cell mode indication and reporting channel and interference feedback for dormant cells in a carrier aggregation environment. In some embodiments, indicators of cell mode for one or more secondary cells are sent (e.g., periodically or aperiodically, etc.) using a transmission mechanism (e.g., broadcast, unicast, multicast, etc.) and may configure active or dormant sub-periods within the indicated periods. Indicators of cell mode for a secondary cell may be transmitted on carriers of the primary cell, or the indicators may be transmitted on carriers of the secondary cell, in some cases. Dormancy for predetermined time periods may also be indicated by the presence or absence of a cell mode indicator.

In some embodiments, a wireless communication device may be configured for dual-connectivity carrier aggregation using carriers from non-collocated base stations. A master cell group associated with a master base station may include a primary cell and one or more secondary cells while a secondary cell group associated with a secondary base station may include one or more secondary carriers, one of which may be a special secondary carrier which may carry an uplink control channel for carriers of the secondary cell group. Cell dormancy may be supported for secondary cells of the secondary cell group using indicators of cell mode broadcast by the special secondary carrier, or broadcast by each of secondary cells of the secondary cell group, in some cases.

Some embodiments are directed to managing channel state information (CSI) reporting for dormant secondary cells. When CSI measurements occur for a carrier associated with a dormant secondary cell, the UE may report CSI for the dormant periods, suppress CSI reporting for the dormant periods, or report some types of CSI and not others for the dormant periods (e.g., report periodic and suppress aperiodic, etc.). Reported CSI may be based on the CSI measurements when the secondary cell was dormant or based on prior CSI measurements made when the secondary cell was active. These techniques may be applied to reporting CSI for secondary carriers of a master cell group or secondary cell group.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
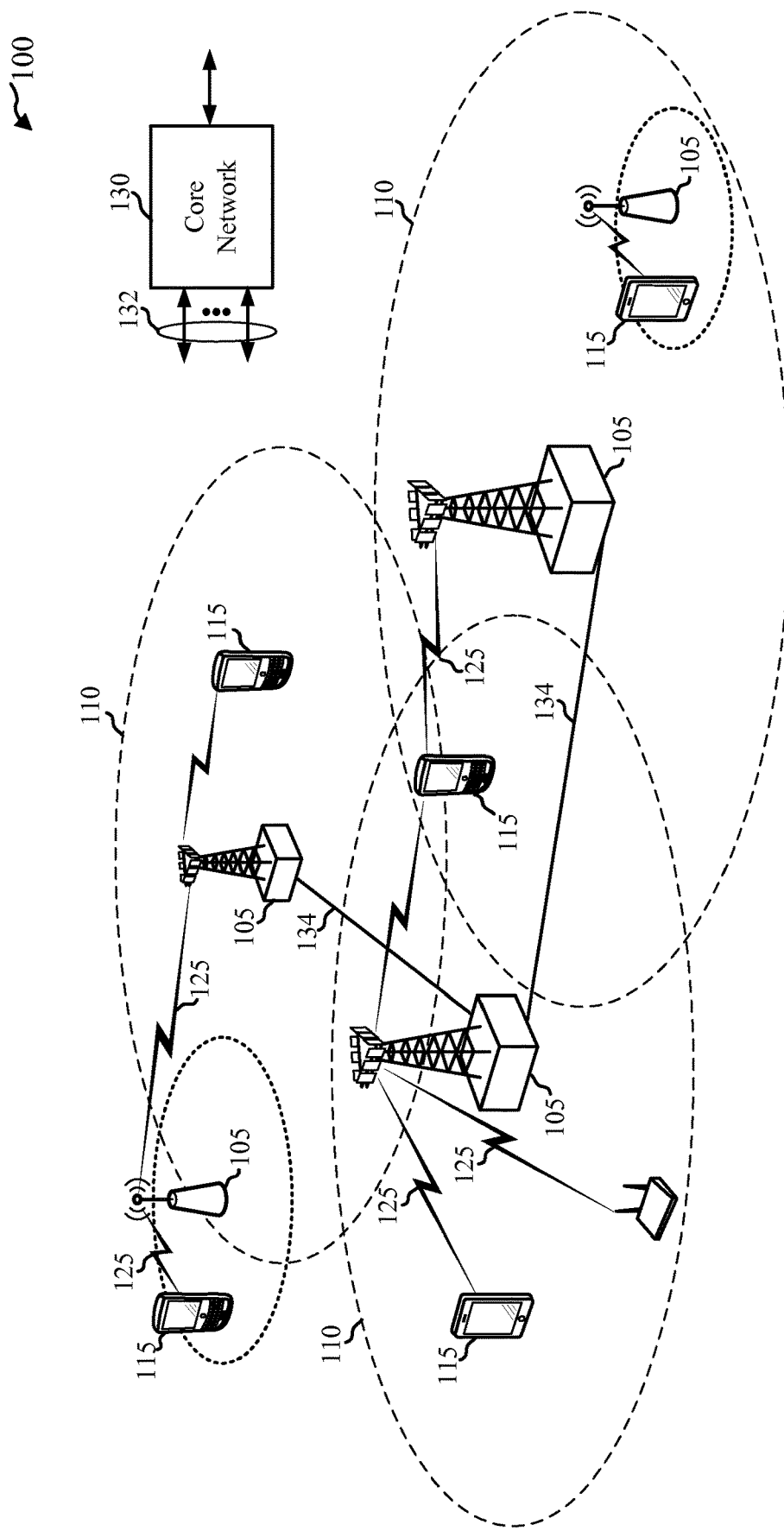
FIG. 1 illustrates an example of a wireless communications system in accordance with various embodiments.

FIG. 1 illustrates an example of a wireless communications system 100 in accordance with various embodiments. The system 100 includes base stations 105, communication devices, also known as a user equipment (UE) 115, and a core network 130. The base stations 105 may communicate with the communication devices 115 under the control of a base station controller (not shown), which may be part of the core network 130 or the base stations 105 in various embodiments. Base stations 105 may communicate control information or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, or pico base stations). There may be overlapping coverage areas for different technologies.

In embodiments, the system 100 is an LTE/LTE-A network. In LTE/LTE-A networks, the terms evolved Node B (eNB) and UE may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a small cell, or other types of cells. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station that may operate in the same or different (e.g., licensed, unlicensed, etc.) frequency bands as macro cells. Small cells include pico cells, femto cells, and micro cells. A pico cell would generally cover a relatively smaller geographic area and may allow unrestricted access by UEs with service subscriptions with the network provider. A femto cell would also generally cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

An eNB 105 may include a base band unit (BBU) and one or more remote radio heads (RRHs), which may be connected by an electrical or optical internal interface (e.g., common public radio interface (CPRI), etc.) to the BBU. Thus RRHs typically have an ideal backhaul to the BBU and operate under the control (e.g., scheduling, precoding, etc.) of the eNB 105. The term small cell network may be used to refer to distributed radio technology including a centralized BBU and one or more RRHs. However, each RRH of a small cell network typically uses the same carrier frequencies and transmits on resources scheduled by the BBU. Therefore, all of the RRHs of such a distributed radio network connected to the same BBU are part of one base station or eNB for the purposes of this description.

The core network 130 may communicate with the eNBs 105 via a backhaul 132 (e.g., S1, etc.). The eNBs 105 may also communicate with one another, (e.g., directly or indirectly) via backhaul links 134 (e.g., X2, etc.) or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between the UE and the network used for the user plane data. At the Physical (PHY) layer, the transport channels may be mapped to Physical channels.

The UEs 115 are dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. The links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

Wireless network 100 may support operation on multiple carriers, which may be referred to as carrier aggregation (CA) or multi-carrier operation. A carrier may also be referred to as a component carrier (CC), a layer, a channel, etc. The terms "carrier," "CC," "cell," and "channel" may be used interchangeably herein. A carrier used for the downlink may be referred to as a downlink CC, and a carrier used for the uplink may be referred to as an uplink CC. A UE 115 may be configured with multiple downlink CCs and one or more uplink CCs for carrier aggregation. Carrier aggregation may be used with both FDD and TDD component carriers.

In one embodiment, UEs 115 are configured with UE-specific primary carriers (e.g., primary cell or PCell) or one or more secondary carriers (e.g., secondary cells or SCells). The PCell may include a downlink primary CC (e.g., downlink PCC) and an uplink primary CC (e.g., uplink PCC). An SCell may include a downlink secondary CC (e.g., downlink SCC) and, if configured, an uplink secondary CC (e.g., uplink SCC). Control information including scheduling for SCells may be performed on the SCell or on a different cell (PCell or SCell), which may be referred to as cross-carrier control signaling. The PCell may be identified by the UE 115 prior to establishing a connection with an eNB 105 (e.g., as the strongest available carrier, etc.). Once the UE 115 establishes a connection with an eNB 105 via the PCell, one or more SCells may be configured via higher layer signaling (e.g., RRC, etc.). Configuration of SCells may include, for example, sending all system information (SI) for the SCell over RRC signaling.

In some cases, both PCell and SCells are supported by the same base station 105. In other cases, the PCell may be supported by one base station 105 and one or more SCells may be supported by the same base station 105 or a different base station 105. The techniques described herein may be applied to a carrier aggregation scheme with a PCell and any number of SCells supported by one or more base stations 105.

In some cases, configured SCells are activated and deactivated for individual UEs 115 by a configuring cell using a primary carrier (e.g., PCell, etc.). For example, activation and deactivation commands for configured SCells may be carried in MAC signaling. When an SCell is deactivated, the UE 115 does not need to monitor for control information for the SCell, does not need to receive the corresponding downlink CC, cannot transmit in the corresponding uplink CC, nor is it required to perform channel quality information (CQI) measurements. Upon deactivation of an SCell, the UE may also flush all HARQ buffers associated with the SCell. Conversely, when an SCell is active, the UE 115 receives control information or data transmissions for the SCell, and is expected to be able to perform CQI measurements. The activation/deactivation mechanism is based on the combination of a MAC control element and deactivation timers. The MAC control element carries a bitmap for the individual activation and deactivation of SCells such that SCells can be activated and deactivated individually, and a single activation/deactivation command can activate/deactivate a subset of the SCells. Generally, one deactivation timer is maintained per SCell. In some cases, all the timers for a UE may be configured with a common value via RRC. However, the UEs are not limited to one timer per SCell, or to all timers being configured with a common value.

An SCell may be configured to serve one or more UEs 115, but in some cases may not have data to transmit to the UEs 115. To conserve power for the eNB 105 and the UEs 115, the SCell may go into a dormant state for time periods when no data is scheduled. When dormant, a cell may transmit sparse overhead signals and channels on the downlink carrier sufficient for a radio resource control (RRC) connected UE to detect, measure and report the dormant carrier to the primary cell. In some cases, higher performance may be obtained by faster turn on and turn off times for cell dormancy. For example, a cell on/off mechanism that operates at the frame or subframe level may provide higher performance gain.

During dormant periods of an SCell, the SCell could be deactivated for each UE served by the SCell. However, cell activation/deactivation is not an efficient mechanism to support notification of cell dormancy, nor is cell activation/deactivation able to support dynamic cell dormancy on the order of frames or subframes. For example, separate activation/deactivation commands are sent to each UE served by the SCell, which take up significant resources and may take several subframes or more for notification of each served UE. In addition, there is a delay (e.g., 8 subframes, etc.) between the MAC control elements activating or deactivating SCells and the UE monitoring for control information and measuring the carrier for CSI reporting. Furthermore, because UEs are not performing CSI measurements for deactivated SCells, reactivation of a fully dormant cell may be a relatively slow process.

Figure 2:
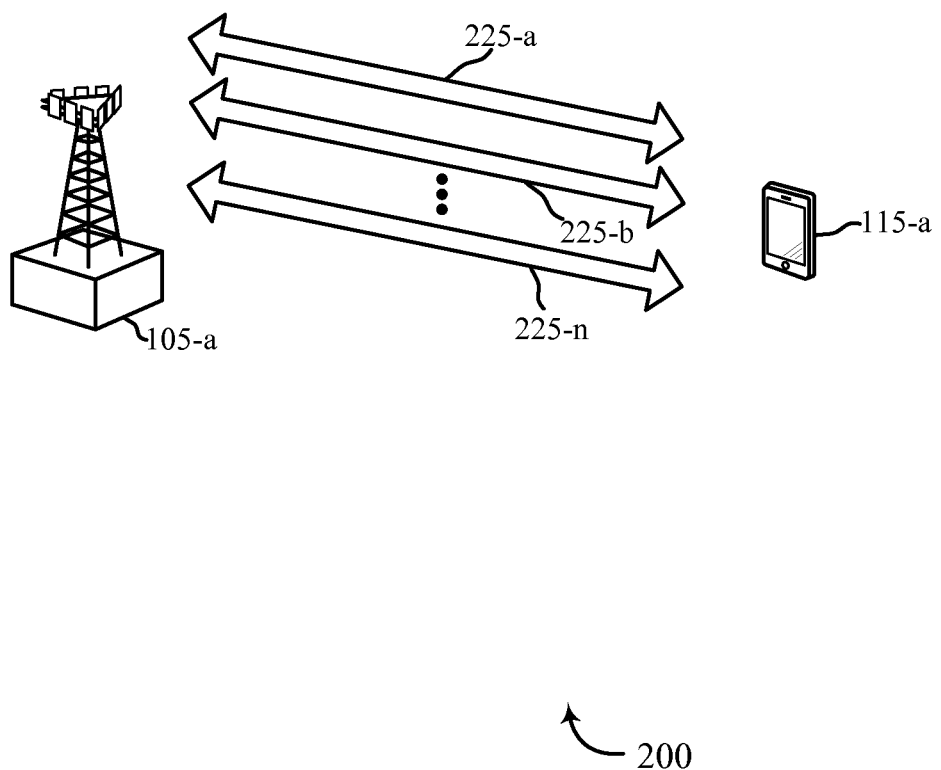
FIG. 2 illustrates an example of a wireless communications system with multiple component carriers serving a wireless communication device in accordance with various embodiments.

FIG. 2 illustrates an example of a wireless communications system 200 with a UE 115-a served by carriers 225 in accordance with various embodiments. In one embodiment, carrier 225-a may be one or more primary carriers (e.g., primary cell or PCell) and other carriers (e.g., 225-b, 225-n, etc.) may be one or more secondary carriers (e.g., secondary cells or SCells). The PCell may include a primary downlink CC and an uplink primary CC. An SCell may include a secondary downlink CC and, if configured, a secondary uplink CC. In some cases, both PCell 225-a and SCells 225-b, 225-n are supported by the same base station 105-a. In other cases, PCell 225-a may be supported by one base station 105-a and one or more SCells 225 may be supported by a different base station 105 (not shown). The techniques described herein may be applied to a carrier aggregation scheme with a PCell and any number of SCells supported by one or more base stations 105.

The systems of FIGS. 1 and 2, including the base stations 105 or UEs 115, may be configured for dynamic cell mode indication and reporting of channel and interference feedback for dormant cells in a carrier aggregation environment. Indicators of cell mode for carriers for one or more SCells may be transmitted using unicast (e.g., transmitted to a single target UE), multicast (e.g., transmitted to a selected subset of UEs), or broadcast (e.g., transmitted in a manner that can be received by all served UEs) signaling and may be sent aperiodically, or periodically to configure active or dormant sub-periods within the indicated periods. Indicators of cell mode for an SCell may be transmitted on carriers of the PCell, or the indicators may be transmitted on carriers of the SCell, in some cases. Dormancy may also be indicated by the presence or absence of a cell mode indicator.

Some embodiments are directed to managing channel state information (CSI) reporting for dormant SCells. When CSI measurements occur for a carrier associated with a dormant SCell, the UE may report CSI for the dormant periods, suppress CSI reporting for the dormant periods, or report some types of CSI and not others for the dormant periods (e.g., report periodic and suppress aperiodic, etc.). Reported CSI may be based on the CSI measurements when the SCell was dormant or based on prior CSI measurements made when the SCell was active.

Figure 3:
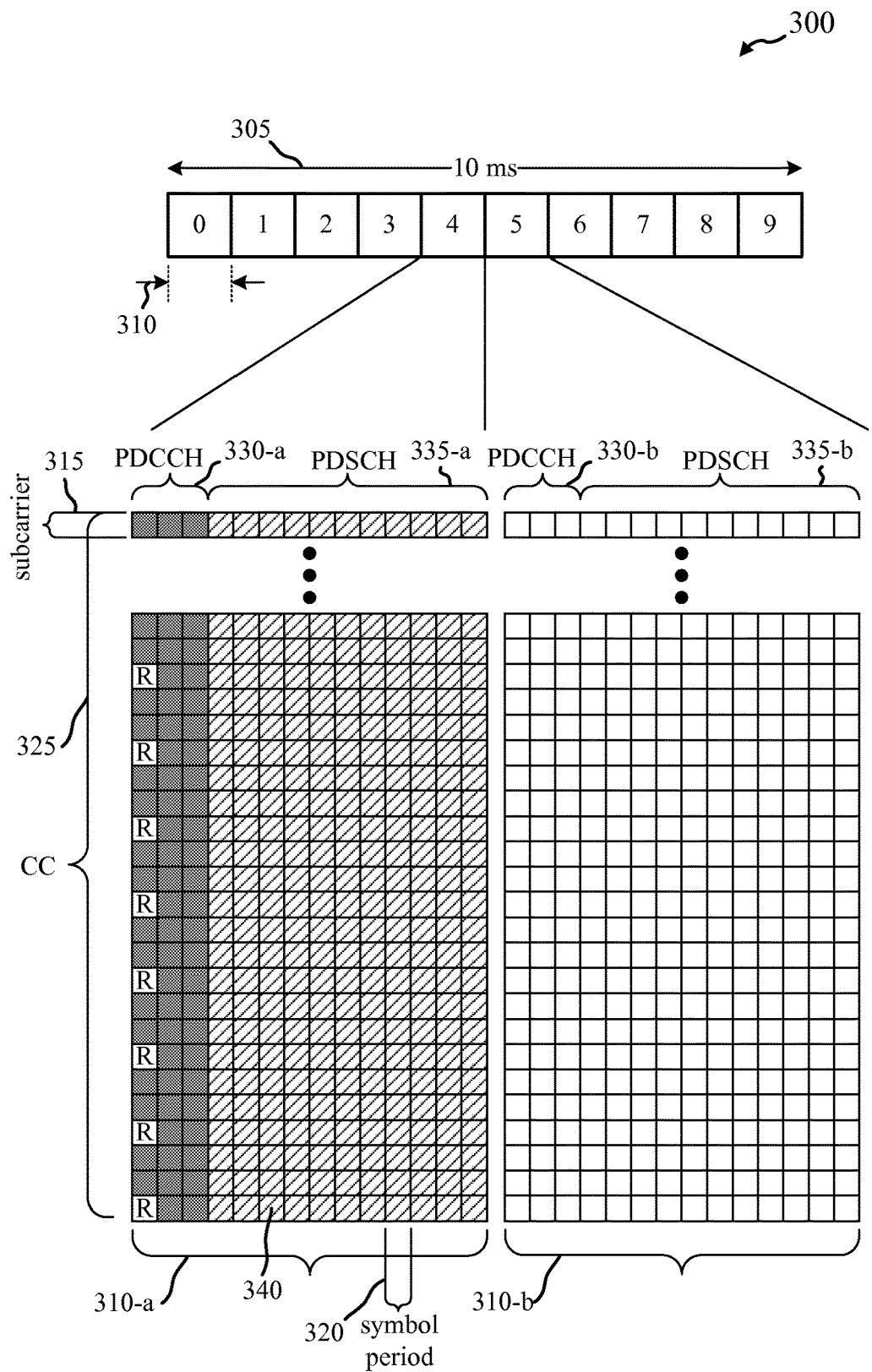
FIG. 3 shows a diagram of a conventional subframe and a dormant subframe in accordance with various embodiments.

FIG. 3 shows a diagram 300 of a radio frame 305 for an OFDMA downlink component carrier 325 in accordance with various embodiments. Component carrier 325 covers an amount of bandwidth available for a carrier which may be partitioned into multiple (K) orthogonal subcarriers 315, which are also commonly referred to as tones, bins, or the like. Each subcarrier 315 may be modulated with data. One subcarrier 315 over one symbol period 320 may be referred to as a resource element 340. The spacing between adjacent subcarriers 315 may be fixed, and the total number (K) of subcarriers 315 may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Radio frame 305 may have a radio frame length of 10 milliseconds (ms). Frame 305 may be divided into a number of subframes 310. For example, frame 305 may be divided into 10 subframes 310 as depicted in diagram 300, where each subframe may have a length of 1 ms. Each subframe 310 may be further subdivided into a number of symbol periods. Each symbol period may cover a length of time sufficient to transmit a single modulation symbol. A symbol period may also include a period of time reserved for a guard period or transmission of a cyclic prefix.

Resource elements 340 may be used for different purposes. For example, a set of resource elements may be reserved for the transmission of a downlink control channel. This set may be correspond to the physical downlink control channel (PDCCH) 330-a or 330-b. Another set of resource elements may correspond to a physical downlink shared channel (PDSCH) 335-a or 335-b. Some resource elements within the PDCCH 330 or PDSCH 335 may be used for the transmission of reference signals (e.g., cell-specific reference signals (CRS), channel state information reference signals (CSI-RS), positioning reference signals (PRS), multicast-broadcast single-frequency network (MBSFN) reference signals, UE-specific reference signals which may also be known as demodulation reference signals (DM-RS), etc.). Reference signals may be used for channel identification and channel quality estimation. PDSCH 335-a may be used to transmit user data to one or more UEs 115 with reference to FIGS. 1 and 2.

As illustrated in FIG. 3, a radio frame 305 for downlink component carrier 325 may include a conventional subframe 310-a and a dormant subframe 310-b. The component carrier 325 may correspond to the downlink carrier of SCell 225-b or SCell 225-n of FIG. 2, for example. In one embodiment, a carrier may be dormant for one or more frames 305. In another embodiment, a carrier may be dormant for a number of subframes 310 within a frame 305.

In some embodiments, no modulation symbols are transmitted on PDCCH 330-b or PDSCH 335-b during dormant subframes. In some cases, some signals are sent, but the amount of signaling is reduced. A dormant cell may continue to transmit some reference signals or some control information, in some cases. For example, a dormant cell may transmit overhead (discovery) signal transmissions on a downlink carrier with low periodicity. For active cells, primary synchronization signals (PSS) and secondary synchronization signals (SSS) may be transmitted with a periodicity of M=5 ms, cell-specific reference signals (CRS) may be transmitted every active subframe, CSI-RS may be transmitted every K active subframes (e.g., every fifth active subframe, etc.), and positioning reference signals (PRS) may be transmitted as configured. For a dormant cell, PSS/SSS and CRS/CSI-RS/PRS may be transmitted in N ms bursts every M ms with L ms offset. The parameters N, M, and L may be defined in a discovery reference signal (DRS) configuration for the SCell and may be configured by a serving active cell (e.g., PCell, etc.).

In one example, values for these variables for a dormant cell may be N=1, M=80 ms, or 160 ms, and L=0. UEs may detect dormant cells using PSS/SSS and measure reference signal received power (RSRP) on CRS/CSI-RS/PRS. The system frame number (SFN) may be synchronized with neighboring active cells (e.g., PCell). In some cases, a subframe or SFN offset might also be configured. In one embodiment, active cells (e.g., PCell, other SCells, etc.) do not schedule data traffic on subframes where a discovery signal for a dormant SCell is configured. UE radio resource management (RRM) measurements may be based on low periodicity CRS/CSI-RS/PRS. The UE 115 may determine how to combine or select CSI-RS, PRS, and CRS measurements.

In some embodiments, a time period (e.g., a number of radio frames such as 1, 2, 4, 5, 8, 10, etc.) may be defined for transmission of cell mode indicators for SCells. UEs may monitor for the cell mode indicators at the given periodicity (e.g., prior to or at the beginning of each time period, etc.) for configured SCells to determine if the SCell is dormant for the time period or for a portion of the time period (e.g., one or more frames or subframes, etc.). Dormancy for predetermined time periods may also be indicated by the presence or absence of a cell mode indicator.

Additionally or alternatively, indicators of cell mode may be transmitted aperiodically. Aperiodic indicators of cell mode may be effective until a further cell mode indicator is transmitted. For example, a cell mode indicator received at subframe n–k (e.g., where k is a number such as 1, 2, 3, 4, 5, 8, etc.) may be valid for subframe n and all other subsequent subframes until a further cell mode indicator is transmitted. Transmission of aperiodic cell mode indicators may be restricted to a subset of frames (e.g., every 2, 4, 5, 8, 10, etc. frames, frames configured for DRS, etc.) and/or a subset of subframes within frames (e.g., subframes 0 and 5 of each frame or selected frames, etc.). Restricted transmission timing for cell mode indicators may reduce the amount of blind decoding for control information used to transmit the cell mode indicators. Thus, cell mode indicators may be transmitted according to any combination of timing schemes (e.g., aperiodic or periodic) and transmission schemes (e.g., unicast, multicast, or broadcast).

The indicator may be transmitted over a carrier of the SCell itself, or transmitted by another cell (e.g., PCell, etc.), in some cases. The broadcast cell mode indicators may have multiple bits and may select between multiple stored configurations for the SCells. The multiple configurations may include one or more stored configurations for the SCells in the non-dormant state as well as one or more stored configurations for the SCells in the dormant state.

Figure 4A:
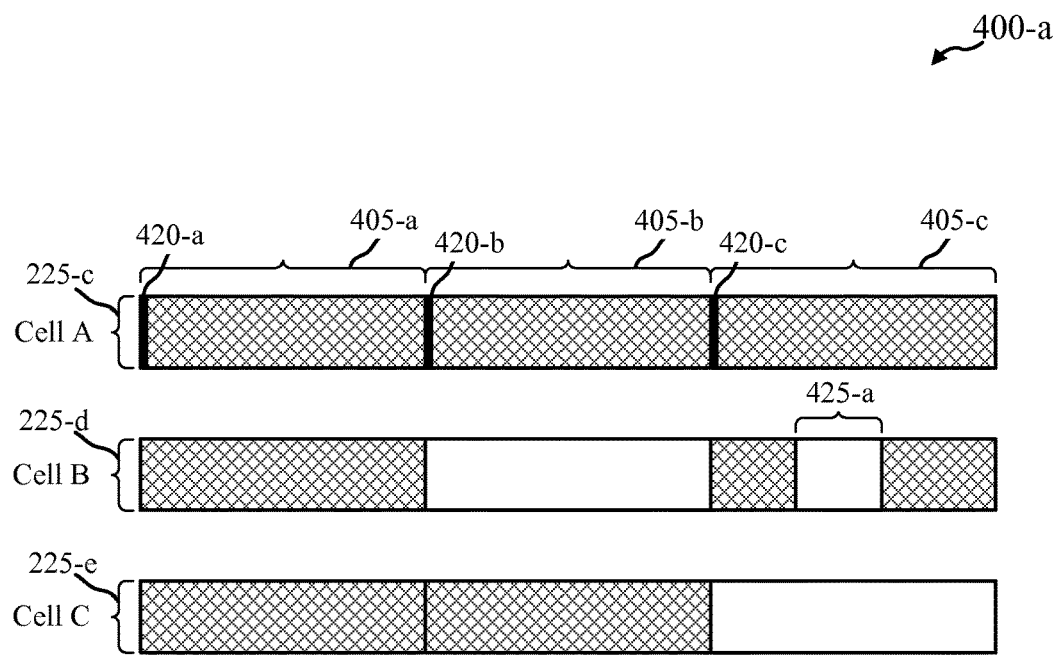
FIGS. 4A, 4B, and 4C show diagrams of periodic dormancy indication for secondary carriers in accordance with various embodiments.

FIG. 4A shows a diagram 400-*a* of indication of cell mode for one or more SCells in accordance with various embodiments. Diagram 400-*a* illustrates carriers for Cell A 225-*c*, Cell B 225-*d*, and Cell C 225-*e* (only downlink CCs are shown for clarity). The illustrated cells 225 may support the same UE, and each of the cells 225 may support more than one UE. Some of the cells 225 (e.g., SCells) may enter a dormant state in which they do not transmit user data on the associated downlink CC 325 and also reduce control signaling and reference signaling, as described above.

In some embodiments, Cell A 225-*c* may be a PCell (e.g., PCell 225-*a* of FIG. 2), while Cell B 225-*c* and Cell C 225-*d* may be SCells (e.g., SCell 225-*b* or SCell 225-*n* of FIG. 2). In embodiments, cell mode indicators are transmitted for Cell B 225-*d* and Cell C 225-*e* (e.g., SCells) by Cell A 225-*c* (e.g., PCell). For example, a time period 405 (e.g., a number of frames such as 1, 2, 4, 5, 8, 10, etc.) may be determined for periodically transmitting cell mode indicators. Cell A 225-*c* may transmit (e.g., broadcast, multicast, unicast, etc.) periodic cell mode indications 420 regarding whether Cell B 225-*d* and Cell C 225-*e* are active or dormant for the given time period 405, or a cell mode configuration of active subperiods (e.g., subframes) within the time periods 405.

In some embodiments, Cell A 225-*c* transmits cell mode indicators for Cell B 225-*d* and Cell C 225-*e* regardless of whether these cells are configured for self-scheduling or cross-carrier scheduling of control information for UEs served by the cells. While FIG. 4A illustrates transmission of cell mode indicators over a carrier of Cell A 225-*c* (e.g., PCell) for two other cells (e.g., SCells), cell mode indicators for any number (e.g., 1, 2, 3, 5, etc.) of cells may be indicated by Cell A 225-*c*.

In diagram 400-*a*, Cell A 225-*c* transmits cell mode indicators 420-*a*, 420-*b*, and 420-*c* at the beginning of time periods 405-*a*, 405-*b*, and 405-*c*, respectively, that indicate cell mode for Cell B 225-*d* and Cell C 225-*e* during the respective time periods. For example, cell mode indicator 420-*a* may indicate that Cell B 225-*d* and Cell C 225-*e* are not dormant during time period 405-*a*. Cell mode indicator 420-*b* may indicate that Cell B 225-*d* is dormant and Cell C 225-*e* is not dormant during time period 405-*b*. Cell mode indicator 420-*c* may indicate that Cell C 225-*e* is dormant for time period 405-*c* while Cell B 225-*d* is dormant for a portion 425-*a* (e.g., one or more subframes, etc.) of time period 405-*c*.

In some embodiments, lack of reception of cell mode indication may be interpreted by UEs 115 as dormant mode. For example, cell mode indicator 420-*b* may omit an indication for Cell B 225-*d* and UEs may interpret the lack of indication of cell mode as dormancy of Cell B 225-*d* for time period 405-*b*. Alternatively, cells may default to active for frames for which no cell mode indication is received. For example, Cell A 225-*c* may not transmit cell mode indicators 420 for Cell B 225-*d* and Cell C 225-*e* for time period 405-*a*, and UEs 115 may interpret the lack of cell mode indication for Cell B 225-*d* and Cell C 225-*e* for time period 405-*a* as a default to active or non-dormant state.

Additionally or alternatively, Cell A 225-*c* may transmit (e.g., broadcast, multicast, unicast, etc.) cell mode indicators aperiodically. As described above, aperiodic indicators of cell mode may be effective until a further cell mode indicator is transmitted and may be restricted to certain frames or subframes within certain frames. Thus, Cell A 225-*c* may transmit cell mode indicators according to any combination of timing schemes (e.g., aperiodic or periodic) and transmission schemes (e.g., unicast, multicast, broadcast, etc.).

In some embodiments, UEs 115 decode cell mode indicators for activated SCells only. Additionally or alternatively, UEs 115 may decode cell mode indictors for deactivated but configured SCells. In this case, the UEs may assume that activated SCells will transmit PSS/SSS and CRS/CSI-RS/PRS with the normal periodicities of an active cell. In yet another embodiment, an eNB 105 may not broadcast mode information for SCells, and the UE 115 may determine the operating mode on a subframe by subframe basis (e.g., by detecting the presence or periodicities of the various synchronization or reference signals, etc.).

Figure 4B:
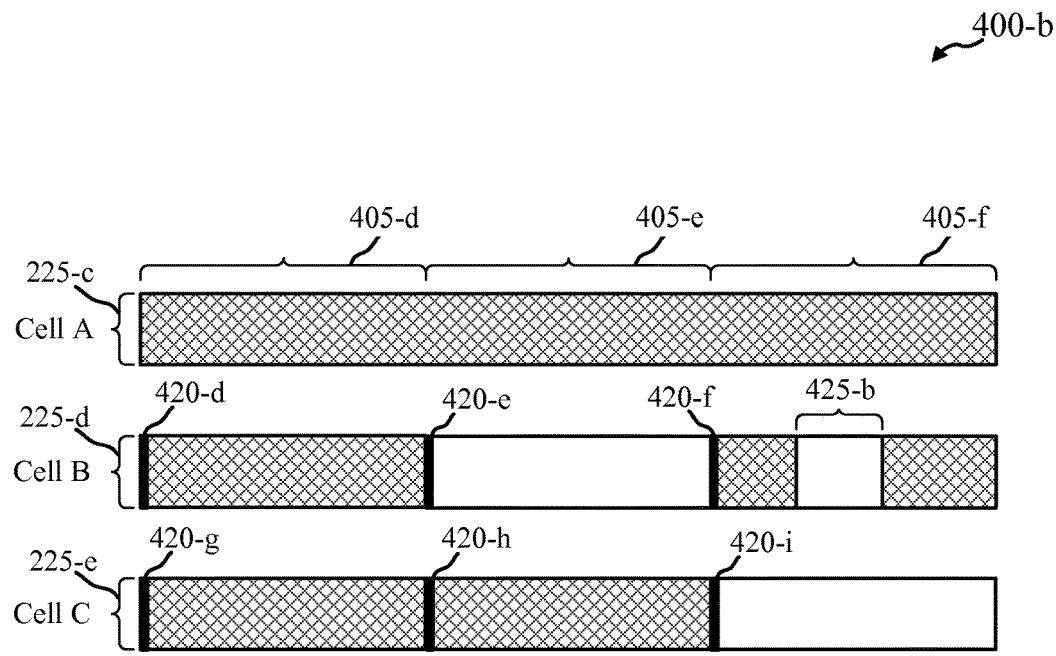

FIG. 4B shows a diagram 400-*b* of indication of cell mode for one or more SCells using indicators sent over carriers of SCells in accordance with various embodiments. Diagram 400-*b* illustrates carriers for Cell A 225-*c*, Cell B 225-*d*, and Cell C 225-*e* (only downlink CCs are shown for clarity). The illustrated cells 225 may support the same UE, and each of the cells 225 may support more than one UE. Some of the cells 225 (e.g., SCells) may enter a dormant state in which they do not transmit user data on the associated downlink CC 325 and also reduce control signaling and reference signaling, as described above.

In some embodiments, Cell A 225-*c* may be a PCell (e.g., PCell 225-*a* of FIG. 2), while Cell B 225-*c* and Cell C 225-*d* may be SCells (e.g., SCell 225-*b* or SCell 225-*n* of FIG. 2). In embodiments, SCells periodically transmit indicators of cell mode. For example, a time period 405 (e.g., a number of frames such as 1, 2, 4, 5, 8, 10, etc.) may be determined for periodically transmitting cell mode indicators. Each SCell (e.g., Cell B 225-*d*, Cell C 225-*e*, etc.) may transmit (e.g., broadcast, multicast, unicast, etc.) a mode indication regarding whether the SCell is active or dormant for the given time period, or a cell mode configuration of active subframes with the frame(s).

In some embodiments, the SCell periodically transmits cell mode indicators regardless of whether the SCell is configured for self-scheduling or cross-carrier scheduling for UEs served by the SCell. For example, even when an SCell is not configured for self-scheduling for any served UEs, the SCell may periodically broadcast cell mode indicators and the served UEs may monitor the downlink CC 325 of the SCell for the cell mode indicators. While FIG. 4B illustrates transmission of cell mode indicators over carriers of two SCells (e.g., Cell B 225-*d* and Cell C 225-*e*), cell mode indicators for any number (e.g., 1, 2, 3, 5, etc.) of cells may be indicated in a similar manner.

In diagram 400-*b*, Cell B 225-*d* transmits cell mode indicators 420-*d*, 420-*e*, and 420-*f* at the beginning of time periods 405-*d*, 405-*e*, and 405-*f* that indicate the cell mode for Cell B 225-*d* during the respective time periods. In the illustrated example, cell mode indicator 420-*d* indicates that Cell B 225-*d* is active or not dormant for time period 405-*d*, cell mode indicator 420-*e* indicates that Cell B 225-*d* is dormant for time period 405-*e*, and cell mode indicator 420-*f* indicates that Cell B 225-*d* is dormant for a portion 425-*b* (e.g., one or more frames or subframes) of time period 405-*f*. Similarly, Cell C 225-*e* transmits cell mode indicators 420-*g*, 420-*h*, and 420-*i* at the beginning of time periods 405-*d*, 405-*e*, and 405-*f*, respectively. In the illustrated example, cell mode indicators 420-*g* and 420-*h* indicate that Cell C 225-*e* is not dormant for time periods 405-*d* and 405-*e*, respectively, while cell mode indicator 420-*i* indicates that Cell C 225-*e* is dormant for time period 405-*f*.

In some embodiments, lack of reception of eNB cell mode indication may be interpreted by UEs 115 as dormant mode. For example, Cell B 225-*d* may omit transmission of cell mode indicator 420-*e*, thus indicating that Cell B 225-*d* is dormant for time period 405-*e*. Alternatively, cells may default to active for frames for which no cell mode indication is received. For example, Cell B 225-*d* may omit transmission of cell mode indicator 420-*d*, thus indicating that Cell B 225-*d* is not dormant for time period 405-*d*.

Additionally or alternatively, Cell B 225-*d* and Cell C 225-*e* may transmit (e.g., broadcast, multicast, unicast, etc.) cell mode indicators aperiodically. As described above, aperiodic indicators of cell mode may be effective until a further cell mode indicator is transmitted and may be restricted to certain frames or subframes within certain frames. Thus, Cell B 225-*d* and Cell C 225-*e* may transmit cell mode indicators according to any combination of timing schemes (e.g., aperiodic or periodic) and transmission schemes (e.g., unicast, multicast, broadcast, etc.).

In some embodiments, UEs 115 decode cell mode indicators for activated SCells only. Additionally or alternatively, UEs 115 may decode cell mode indictors for deactivated but configured SCells. In yet another embodiment, an eNB 105 may not broadcast mode information for SCells, and the UE 115 may determine the operating mode on a subframe by subframe basis (e.g., by detecting the presence or periodicities of the various synchronization or reference signals, etc.).

Figure 4C:
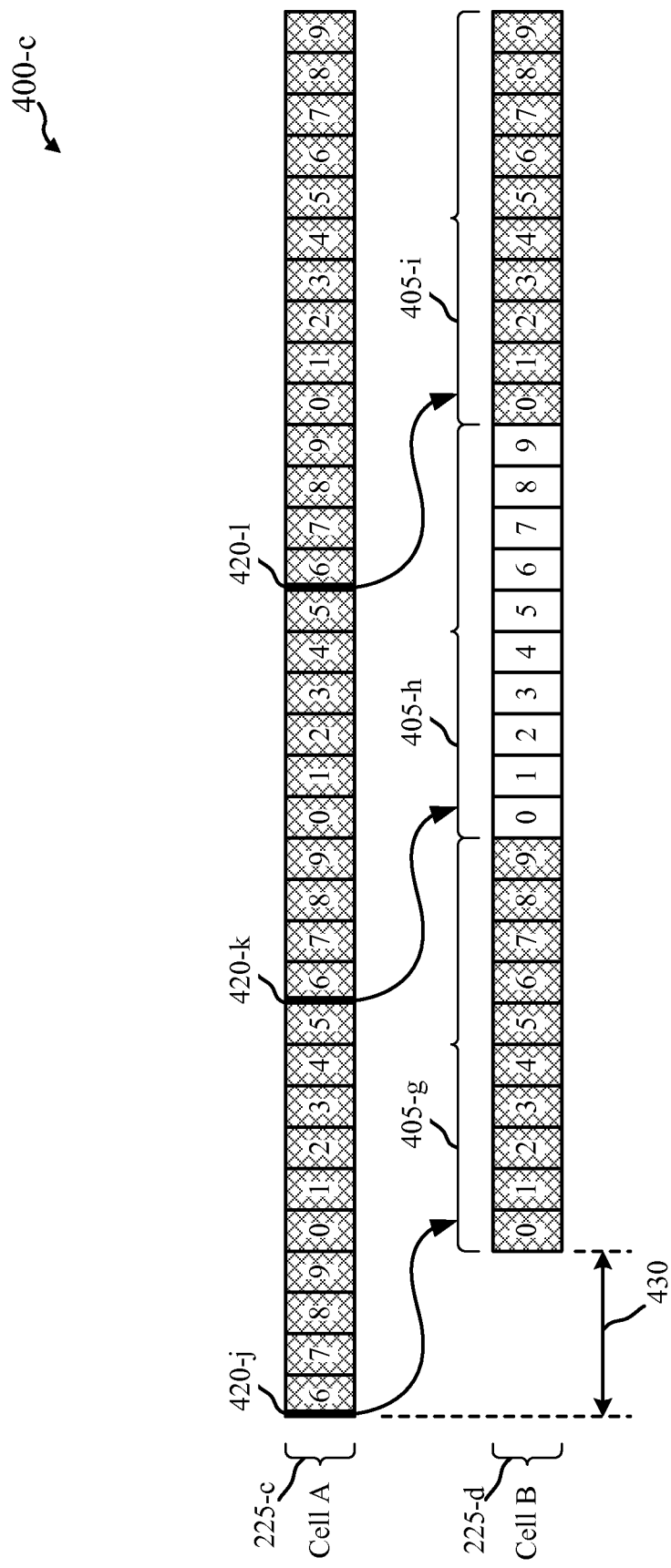

In some embodiments, cell dormancy indicators 420 illustrated in FIGS. 4A and 4B may be transmitted using DCI signaling. FIG. 4C shows a diagram 400-*c* of indication of cell mode for one or more SCells using DCI signaling in accordance with various embodiments. Diagram 400-*c* illustrates carriers for Cell A 225-*c* and Cell B 225-*d* (only downlink CCs are shown for clarity). In diagram 400-*c*, Cell A 225-*c* transmits DCI signaling 420-*j* indicating that Cell B 225-*d* is not dormant for time period 405-*g* (e.g., frame, etc.), DCI signaling 420-*k* indicating that Cell B 225-*d* is dormant for time period 405-*h*, and DCI signaling 420-1 indicating that Cell B 225-*d* is not dormant for time period 405-*i*. While diagram 400-*c* illustrates DCI signaling used for transmission of cell mode indication from different cells, DCI signaling may also be used for transmission of cell mode indication from the cell itself as illustrated in FIG. 4B. Additionally or alternatively, DCI signaling may indicate scheduling for a message in a physical shared channel (e.g., PDSCH) that includes the cell dormancy indicators 420.

In some embodiments, cell state indicators may be transmitted in a certain subframe and become valid a certain number of subframes (e.g., 1, 2, 4, 5, 8, etc.) after transmission. For example, diagram 400-*c* indicates that cell state indicators 420 may be transmitted in a subframe n and become valid for a dormancy period beginning at subframe n+4. Where cell state indicators are transmitted from the same cell (e.g., from Cell B 225-*e*) or from a different cell which is frame aligned with the SCell as illustrated in FIG. 4C, the indicators may thus be transmitted in subframe 6 to indicate cell mode for the next radio frame (which begins 4 subframes after subframe 6). The offset 430 may allow UEs 115 to process the signaling and be ready for measurements of the SCell.

In addition or alternatively to periodic transmission, cell mode indicators may be transmitted aperiodically. As described above, aperiodic indicators of cell mode may be effective until a further cell mode indicator is transmitted and may be restricted to certain frames or subframes within certain frames. Thus, cell dormancy indicators 420 may be sent according to any combination of timing schemes (e.g., aperiodic or periodic) and transmission schemes (e.g., unicast, multicast, or broadcast).

In some embodiments cell mode indicators 420 may use DCI Format 1C and may be transmitted in a common search space. One DCI Format 1C message may carry cell mode indicators for more than one SCell. For example, a bitmap may be sent using DCI Format 1C including bits representing the cell mode for multiple SCells 225. The bitmap may include multiple bits for each SCell where the multiple bits are used to carry information related to cell dormancy for subperiods (e.g., subframes, etc.) of the time periods 405 between periodic transmissions of cell dormancy indicators. Other DCI formats including DCI Formats 3 and 3A may be used, in other examples.

While DCI Formats have relatively high reliability, error scenarios in receiving cell indicators may be handled in a variety of ways. In some embodiments, lack of reception of a periodic transmission of cell indicators may be interpreted as an SCell being dormant for the associated dormancy time period. This may prevent CSI measurements when the SCell is dormant, which may have a larger impact on system performance than not utilizing subframes for CSI measurements when an SCell is in a non-dormant state.

In some embodiments, UEs 115 may be configured for carrier aggregation of cells associated with non-collocated base station groups or eNBs 105. The non-collocated eNBs 105 may include a master eNB (MeNB) and one or more secondary eNBs (SeNB), each supporting multiple carrier frequencies. In some examples, the carrier frequencies utilized by the MeNB may be different than the carrier frequencies utilized by the SeNB. SeNBs may operate semi-autonomously and may be connected to the MeNB using an inter-eNB communication interface (e.g., S1, X2, etc.) that may be a non-ideal backhaul. In some examples, SeNBs are small cells (e.g., operator or user deployed, etc.) and may communicate with the MeNB using existing backhaul, which may be consumer-grade backhaul such as leased Internet connections. A configuration for carrier aggregation including carriers from an MeNB and one or more SeNBs may be referred to as "multiflow" or "dual-connectivity."

The cells associated with the MeNB may be referred to as a master cell group (MCG). One cell within an MCG may be configured as a PCell, while the remaining cells may be SCells. Cells associated with the SeNB may be referred to as a secondary cell group (SCG). SCGs may include a special secondary cell (SSCell), which may be used to carry PUCCH (on the associated uplink CC) from UEs configured for operation using cells from the SCG. Thus, UEs configured for dual-connectivity may transmit one PUCCH to the MeNB over the uplink PCC and a second PUCCH to the SeNB over the uplink SCC of the SSCell. The PUCCH associated with the SSCell facilitates CSI and HARQ feedback for all cells of the SCG. In some embodiments, if the SSCell is configured for any UEs, it may remain active (e.g., not go dormant).

Figure 5:
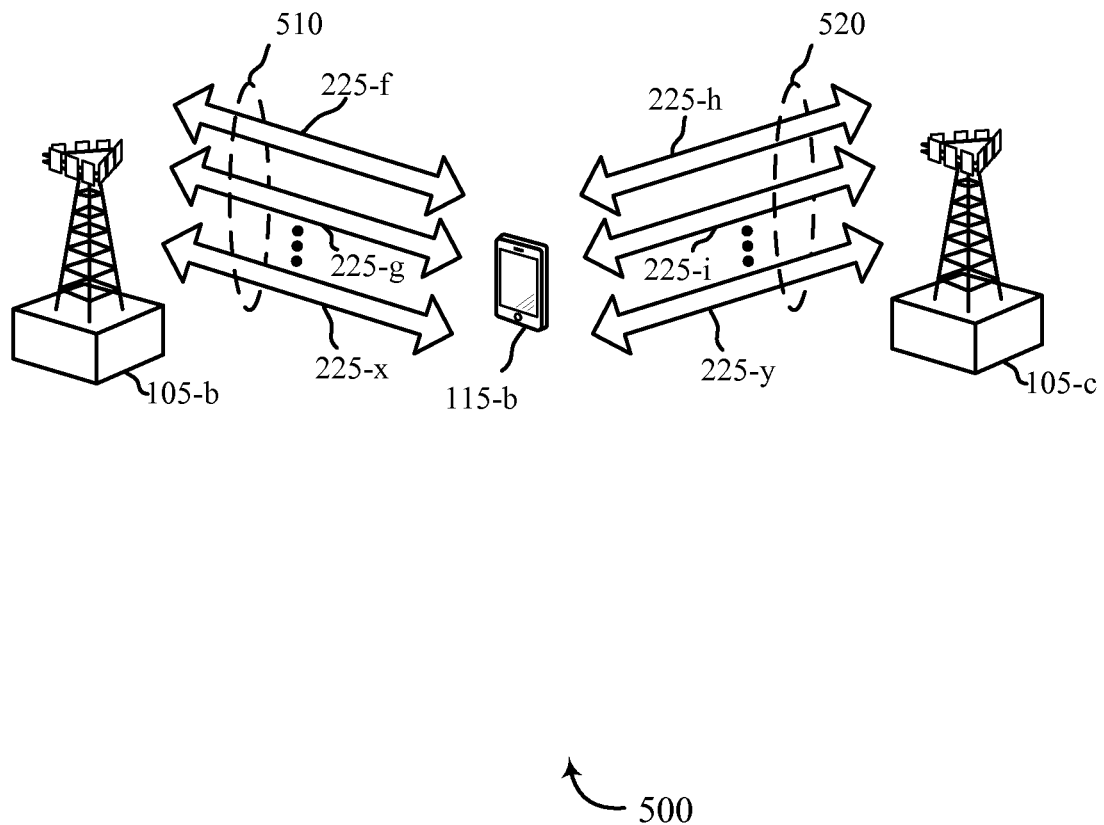
FIG. 5 shows an example of a wireless communications system including a wireless communication device configured for dual connectivity carrier aggregation in accordance with various embodiments.

FIG. 5 illustrates an example of a wireless communications system 500 with a UE 115-b configured for dual connectivity in accordance with various embodiments. In wireless communications system 500, MeNB 105-b may be associated with MCG 510, which may include multiple carriers (e.g., carriers 225-f, 225-g, 225-x, etc.). In one embodiment, carrier 225-f may be one or more primary carriers (e.g., PCell) and other carriers (e.g., 225-g, 225-x, etc.) may be one or more secondary carriers (e.g., SCells). SeNB 105-c may be associated with SCG 520, which may also include multiple carriers (e.g., carriers 225-h, 225-i, 225-y, etc.). In one embodiment, carrier 225-h may be an SSCell, while other carriers (e.g., 225-i, 225-y, etc.) of SCG 520 may be SCells.

As illustrated in FIG. 5, UE 115-b may be configured for dual-connectivity using one or more carriers of MCG 510 and one or more carriers of SCG 520. For example, UE 115-b may initially connect to eNB 105-b and may be configured with carrier 225-f as the PCell. SSCell 225-h may then be configured for UE 115-b using RRC or MAC control element (CE) signaling. Additionally, SSCell 225-h may be activated and deactivated for UE 115-b using RRC or MAC CE signaling. Signaling to configure, activate, and deactivate SSCell 225-h may be transmitted using PCell 225-c, for example.

In some embodiments, the SSCell 225-h may also enter a dormant state during time periods when it is not actively transmitting or receiving. Signaling the cell state of the SSCell 225-h using synchronous techniques as described above may not be effective because of the potential for variable delays caused by non-ideal backhaul. In some embodiments, RRC signaling (e.g., via PCell 225-c) is used to indicate the cell state of the SSCell 225-h. In some embodiments, the UE 115-b stores one or more configurations for the SSCell 225-h and signaling from the PCell 225-c may carry an indication of the cell state for SSCell 225-h and may not include a full set of configuration parameters. A single or multiple bit(s) may be used to signal activation of the existing configuration. The single or multiple bit(s) may be included, for example, in an RRC message, MAC CE, or embedded in a new or existing physical channel on the PCell 225-c. In some embodiments, the UE 115-b may store multiple configurations for SSCell 225-h, which may include one or more configurations for SSCell 225-h in the activated or non-dormant state as well as one or more configurations for SSCell 225-h in the deactivated or dormant state.

In some embodiments, the UE 115-b may store multiple configurations for the SSCell 225-h or SCG 520, and activation or reconfiguration of the SSCell 225-h or SCG 520 may be selected by signaling (e.g., using multiple bits) which of the stored configurations the UE 115-b should use. In some instances, the SSCell 225-h may carry signaling related to configuration or activation/deactivation of the SSCell 225-h or SCG 520. For example, the SSCell 225-h may carry MAC signaling to deactivate SCells of SCG 520 or the SSCell 225-h itself. Additionally or alternatively, the SSCell 225-h may carry MAC or PHY layer signaling to indicate the state of the SSCell 225-h or cells of the SCG 520.

In some embodiments, cell dormancy is supported for SCells of the MCG 510 and SCG 520 using the techniques described above. For example, indicators of cell dormancy for SCells associated with MCG 510 may be transmitted (e.g., broadcast, multicast, unicast, etc.) by the PCell 225-f of MCG 510 as described above with reference to FIG. 4A. Thus, Cell A 225-c of diagram 400-a may illustrate broadcast of cell mode indicators 420 by PCell 225-f for SCells of MCG 510 (e.g., SCell 225-g, SCell 225-x, etc.). The cell mode indicators 420 may carry multiple bits for each SCell and may select between multiple configurations for the SCells of MCG 510. The multiple configurations may include one or more stored configurations for the SCells in the non-dormant state as well as one or more stored configurations for the SCells in the dormant state.

In other cases, indicators of cell dormancy may be transmitted (e.g., broadcast, multi-cast, unicast, etc.) by SCells of the MCG 510. For example, SCell 225-g and SCell 225-x may broadcast cell mode indicators 420 that indicate cell dormancy as illustrated by Cell B 225-d or Cell C 225-e of FIG. 4B.

An SeNB 105 associated with an SCG 520 (e.g., SeNB 105-c) may control cell dormancy for SCells of the SCG 520 autonomously or semi-autonomously by transmitting (e.g. broadcast, multi-cast, unicast, etc.) cell mode indicators over the SSCell or SCells themselves. For example, cell dormancy may be supported for SCells of the SCG 520 using the techniques described with reference to FIGS. 4A and 4B. In some embodiments, SSCell 225-h may transmit indicators of cell dormancy for SCells associated with SCG 520 as described above with reference to FIG. 4A. In this example, SSCell 225-h may remain active for each time period 405 as illustrated by Cell A 225-c of FIG. 4A. In other cases, indicators of cell dormancy may be transmitted by SCells of the SCG 520. For example, SCell 225-i and SCell 225-y may transmit cell mode indicators 420 that indicate cell dormancy as illustrated by Cell B 225-d or Cell C 225-e of FIG. 4B. The cell mode indicators 420 may carry multiple bits and may select between multiple stored configurations for the SCells of SCG 510. The multiple configurations may include one or more stored configurations for the SCells in the non-dormant state as well as one or more stored configurations for the SCells in the dormant state.

Cell timing (e.g., frames, subframes, etc.) of carriers of MCG 510 and SCG 520 may be synchronized, or unsynchronized in some cases. Additionally or alternatively, the time periods for cell dormancy for MCG 510 and SCG 520 may be different. For example, an MCG 510 may use a cell dormancy period of one radio frame, while SCG 520 may use two radio frames. Thus, the time periods for cell dormancy and periodic indications of cell dormancy may be the same or different and may be synchronized or unsynchronized.

Figure 6A:
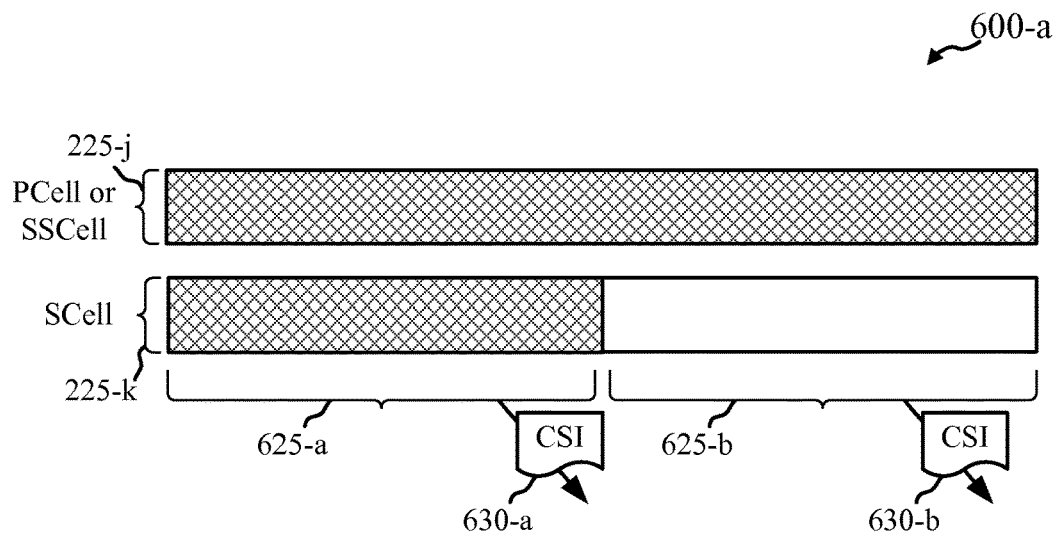
FIGS. 6A and 6B show diagrams of a CSI reporting configuration for dormant time periods in accordance with various embodiments.

FIG. 6A shows a diagram 600-*a* of a CSI reporting configuration for cell dormancy periods in accordance with various embodiments. Diagram 600-*a* may illustrate CSI reporting for dormancy periods for SCells associated with an eNB, an MeNB, or an SeNB. Diagram 600-*a* illustrates PCell 225-*j* (or SSCell 225-*j* when illustrating cells associated with an SeNB) and SCell 225-*k*. In diagram 600-*a*, only the downlink CCs are illustrated for clarity. The illustrated PCells, SSCells, or SCells may support the same UE, and each of the PCells, SSCells, or SCells may support more than one UE. SCells may enter a dormant state in which they do not transmit user data on the associated downlink CC 325 and also reduce control signaling and reference signaling, as described above. UEs may send CSI reports 630 on an uplink carrier of the SCell 225-*k* or PCell/SSCell 225-*j*, as appropriate. For example, where SSCell 225-*j* and SCell 225-*k* are associated with an SCG 520, UEs may report CSI either on PUCCH using the uplink carrier of the SSCell 225-*j*, or on PUSCH using the uplink carrier of the SSCell 225-*j* or using an uplink carrier of the SSCell 225-*k*, if configured.

In diagram 600-*a*, the SCell 225-*k* is active for a first time period 625-*a* (e.g., frames or subframes, etc.), and dormant for a second time period 625-*b*. A UE 115 configured for CA using PCell 225-*j* and SCell 225-*k* may send (e.g., on an uplink control channel, etc.) CSI report 630-*a* based on measurements of CSI resources (e.g., CRS, CSI-RS, etc.) or interference measurement resources (IMR) (e.g., CSI interference measurement (CSI-IM) resources, etc.) for the downlink CC 325 of SCell 225-*k* for time period 625-*a*. CSI report 630-*a* may include periodic or aperiodic CSI reports. For time period 625-*b* where the SCell 225-*k* is dormant, the UE 115 may be configured to send CSI report 630-*b*.

CSI report 630-*b* may be based on a CSI reporting configuration that is different than the CSI reporting configuration for time period 625-*a*. In some embodiments, CSI report 630-*b* is based on CSI measurements for the downlink CC 325 of SCell 225-*k* when the SCell 225-*k* was active. For example, the UE 115 may continue to report CSI during dormant period 625-*b*, but the CSI report 630-*b* may be based on the latest valid CSI resources (e.g., CRS, CSI-RS, etc.). Thus, CSI report 630-*b* may include CSI based on channel or interference measurements from time period 625-*a*.

In some embodiments, the CSI reporting configuration for time period 625-*b* includes reporting some types of CSI while suppressing other types. In some cases, the UE 115 may suppress reporting for aperiodic CSI for dormant SCells while continuing to report periodic CSI. Alternatively, the UE 115 may suppress reporting for periodic CSI for dormant SCells while continuing to report aperiodic CSI based on aperiodic CSI triggers for dormant SCells.

In some embodiments, the CSI reporting configuration for time period 625-*b* is associated with a different configuration for measuring and reporting based on CSI-RS signals. For example, the CSI reporting configuration for time period 625-*b* may include measuring and reporting CSI based on different reference signals or a different measurement periodicity or offset than time period 625-*a*. For example, CSI-RS may be transmitted with the same or reduced periodicity during time period 625-*b* relative to time period 625-*a*, while CRS may be suppressed during time period 625-*b*. CSI report 630-*b* may include CSI generated from the transmitted CSI-RS. In some examples, CSI-RS may be transmitted during burst periods for time periods when the SCell is dormant. For example, CSI-RS may be transmitted every K' subframes with a subframe offset Δ' during a burst period of N subframes with a burst periodicity of M subframes and a burst offset of L subframes, where K' is the CSI-RS periodicity and Δ' is the subframe offset for cell dormancy periods. The parameters N, M, and L may be configured according to the DRS configuration and may be defined in terms of frames or subframes. In some examples, K' and Δ' may be separately configured from the CSI-RS periodicity K and subframe offset Δ for non-dormancy periods, and may be determined based on the burst period N (e.g., subframe offset Δ' may be the subframe offset Δ modulo the burst period N, etc.), or may be default values.

Additionally or alternatively, the CSI reporting configuration for time period 625-*b* includes measuring and reporting CSI based on different cells or a different antenna port configuration than time period 625-*a*. For example, CSI-RS may be transmitted by SCell during dormancy periods such as time period 625-*b* from a subset of antenna ports. In some examples, the UE 115 may report CSI for time period 625-*b* for a default subset of antenna ports or may report CSI for a default transmission mode. In some examples, the UE 115 may report CSI for at least one neighboring non-serving SCell for time period 625-*b* (e.g., based on CSI-RS transmitted by the neighboring non-serving SCell during time periods between DRS bursts from the serving SCell, etc.). The neighboring non-serving SCell for reporting may be determined according to the physical cell index (PCI) of the neighboring cell (e.g., having the same PCI as the serving SCell, a PCI indicated via the PCell or SSCell, etc.).

Additionally or alternatively, channel measurement and interference measurement may be handled differently for dormant period 625-*b*. For example, the UE 115 may report CSI based on measurements of IMR (e.g., CSI-IM, etc.) for time period 625-*b*, but may report CQI based on channel measurements from the latest time period that the SCell 225-*k* was active (e.g., time period 625-*a*). In other examples, the UE 115 may report CSI based on measurements of IMR (e.g., CSI-IM, etc.) for time period 625-*b*, but may suppress CQI reporting for time period 625-*b*. In some cases, the UE 115 may send a "null" CSI report 630-*b* indicating that it did not receive a reference signal from the SCell during dormant period 625-*b*.

In some examples, the UE 115 may perform averaging for CSI reporting. For time periods where averaging is performed that include dormant and non-dormant sub-periods, the UE 115 may perform averaging in a variety of ways. For example, the UE may perform averaging for channel measurements (e.g., CQI) only on subframes where the SCell was active and may consider subframes where the SCell was dormant to be invalid for channel measurement. The UE 115 may perform averaging for interference (e.g., IMR) on any subframes including dormant subframes. If enhanced Inter-Cell Interference Cancellation (eICIC) is employed for the SCell, averaging for interference may be restricted to subframe subsets (e.g., where eICIC is not employed in the downlink, etc.).

Figure 6B:
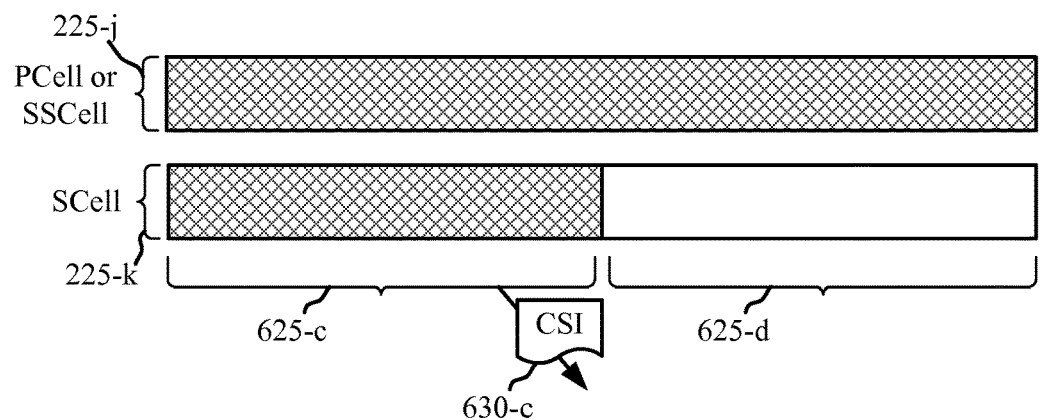

FIG. 6B shows a diagram 600-*b* of a CSI reporting configuration for cell dormancy periods in accordance with various embodiments. Diagram 600-*b* may illustrate CSI reporting for dormancy periods for SCells associated with an eNB, an MeNB, or an SeNB. Diagram 600-*b* illustrates PCell 225-*j* (or SSCell 225-*j* when illustrating cells associated with an SeNB) and SCell 225-*k*. In diagram 600-*b*, only the downlink CCs are illustrated for clarity. The illustrated PCells, SSCells, or SCells may support the same UE, and each of the PCells, SSCells, or SCells may support more than one UE. SCells may enter a dormant state in which they do not transmit user data on the associated downlink CC 325 and also reduce control signaling and reference signaling, as described above. UEs may send CSI reports 630 on an uplink carrier of the SCell 225-*k* or PCell/SSCell 225-*j*, as appropriate. For example, where SSCell 225-*j* and SCell 225-*k* are associated with an SCG 520, UEs may report CSI either on PUCCH using the uplink carrier of the SSCell 225-*j*, or on PUSCH using the uplink carrier of the SSCell 225-*j* or using an uplink carrier of the SSCell 225-*k*, if configured.

In diagram 600-*b*, SCell 225-*k* is active for a first time period 625-*c* (e.g., frames or subframes, etc.), and dormant for a second time period 625-*d*. A UE 115 configured for CA using PCell/SSCell 225-*j* and SCell 225-*k* may send (e.g., on an uplink control channel, etc.) CSI report 630-*c* based on measurements of CSI resources or IMR for the downlink CC 325 associated with SCell 225-*k* for time period 625-*c*. CSI report 630-*c* may include periodic or aperiodic CSI reports. For time period 625-*d* where SCell 225-*k* is dormant, the UE 115 may be configured to suppress CSI reporting. For example, the UE 115 may be allowed to skip reporting CSI feedback if the reference CSI feedback subframe (e.g., CQI measurement subframe, IMR subframe, etc.) occurs when SCell 225-*k* was operating in dormant mode.

Figure 7:
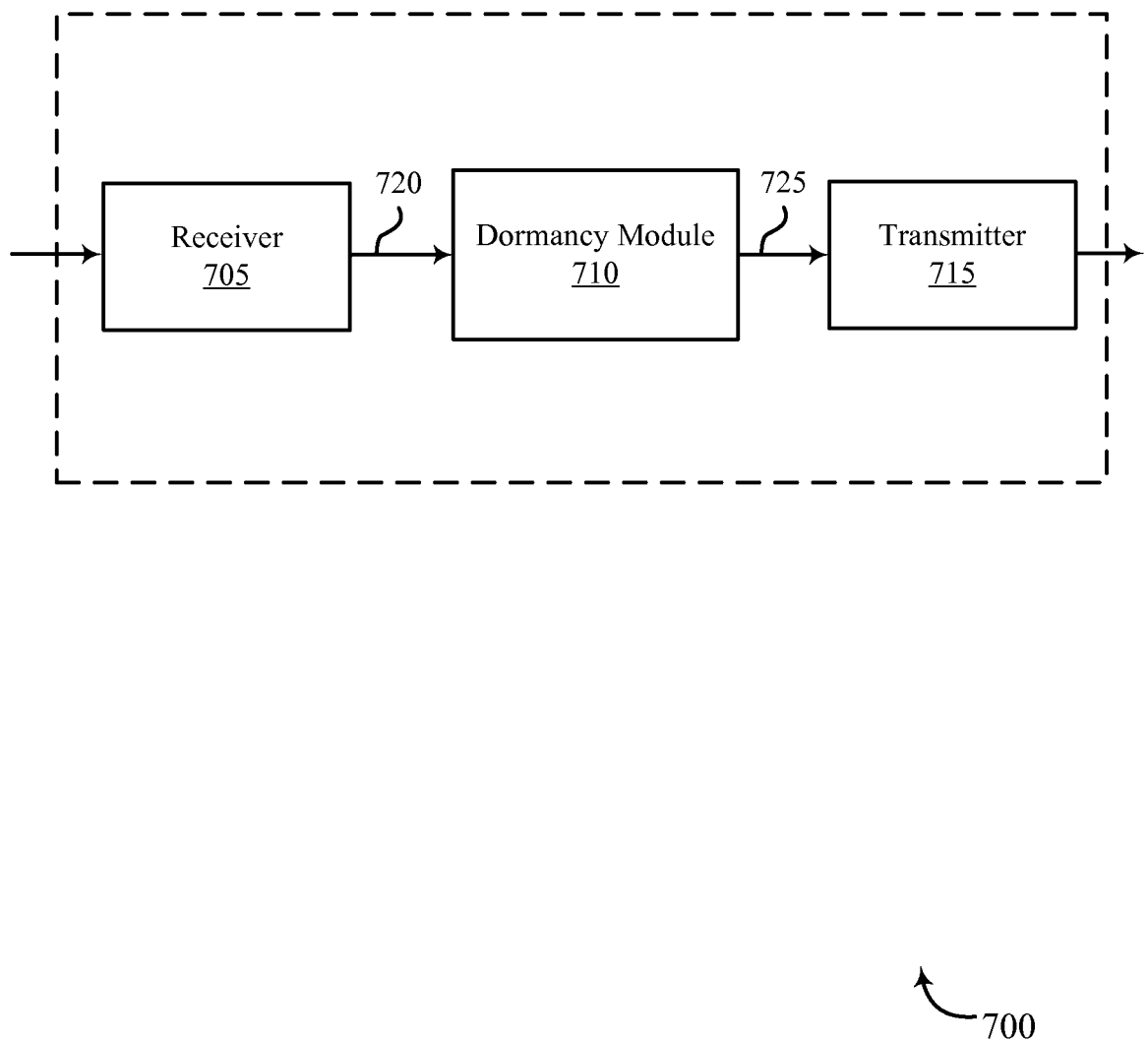
FIG. 7 shows a device for dynamic cell mode indication and reporting channel and interference feedback for dormant cells in a carrier aggregation environment in accordance with various embodiments.

FIG. 7 shows a device 700 for dynamic cell mode indication and reporting channel and interference feedback for dormant cells in a carrier aggregation environment in accordance with various embodiments. The device 700 may be an example of one or more aspects of a UE 115 described with reference to FIGS. 1, 2, 5, and 10. The device 700 may include a receiver 705, a dormancy module 710, or a transmitter 715. The device 700 may also include a processor (not shown). Each of these components may be in communication with each other.

The receiver 705 may receive information such as packets, user data, or control information associated with various information channels (e.g., control channels, data channels, etc.). The receiver 705 may receive the various information channels over a primary carrier associated with a primary cell and one or more secondary carriers associated with secondary cells including special secondary cells. Information 720 may be passed on to the dormancy module 710, and to other components of the device 700. For example, information 720 may include carrier information (e.g., indications of a target carrier for monitoring).

The dormancy module 710 may be means for monitoring (e.g., via receiver 705) a carrier from among a primary carrier and one or more secondary carriers for a periodic indication that at least one secondary carrier is dormant. It may also be means for determining, based on the indication, whether the at least one secondary carrier is dormant for a predetermined time period. The dormancy module 710 may communicate signals 725 to transmitter 715. Signals 725 may include, for example, feedback information (e.g., CSI, etc.) for the one or more secondary carriers.

The transmitter 715 may transmit the one or more signals (e.g., signals 725, etc.) received from other components of the device 700. The transmitter 715 may transmit information over a primary carrier associated with a primary cell and one or more secondary carriers associated with secondary cells. In some embodiments, the transmitter 715 may be collocated with the receiver 705 in a transceiver module.

The transmitter 715 may include a single antenna, or it may include a plurality of antennas.

Figure 8:
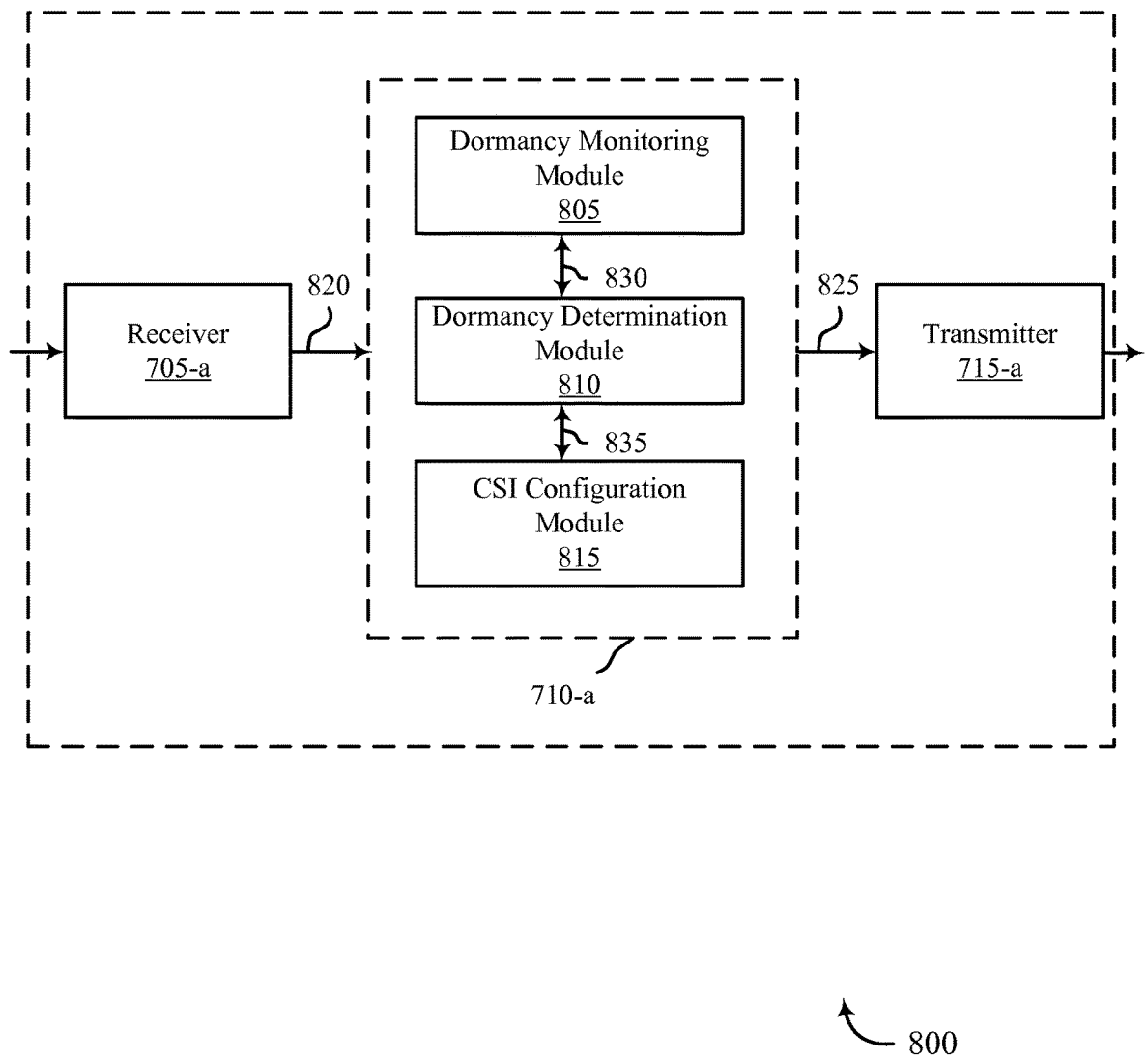
FIG. 8 shows a device for dynamic cell mode indication and reporting channel and interference feedback for dormant cells in a carrier aggregation environment in accordance with various embodiments.

FIG. 8 shows a device 800 for dynamic cell mode indication and reporting channel and interference feedback for dormant cells in a carrier aggregation environment in accordance with various embodiments. The device 800 may be an example of one or more aspects of a UE 115 described with reference to FIGS. 1, 2, 5, and 10. It may also be an example of a device 700 described with reference to FIG. 7. The device 800 may include a receiver 705-*a*, a dormancy module 710-*a*, or a transmitter 715-*a*, which may be examples of the corresponding components of device 700. The device 800 may also include a processor (not shown). Each of these components may be in communication with each other. For example, the receiver 705-*a* may pass information 820 to the dormancy module 810-*a* which may pass one or more signals 825 to the transmitter 715-*a*. The dormancy module 710-*a* may include a dormancy monitoring module 805, a dormancy determination module 810 or a channel state information (CSI) configuration module 815. The receiver 705-*a* and the transmitter 715-*a* may perform the functions of the receiver 705 and the transmitter 715, of FIG. 6, respectively.

The dormancy monitoring module 805 may be means for monitoring a carrier from among a primary carrier and one or more secondary carriers for a periodic indication that at least one secondary carrier is dormant. In one embodiment, it may be means for monitoring a search space of the carrier at a predefined time interval for downlink control information (DCI) comprising the indication. In some embodiments, the dormancy monitoring module 805 may be means for monitoring for periodic indications of cell dormancy for a multiple carrier configuration including a first carrier group (e.g., MCG 510) and a second carrier group (e.g., SCG 520). In some examples, the dormancy monitoring module 805 may receive cell mode indications which indicate cell dormancy for one or more carriers for a predetermined period of time. In another example, the dormancy monitoring module 805 may receive cell mode indications which indicate dormancy for one or more carriers for an indefinite period of time (e.g., until a next cell mode indication is received). The dormancy monitoring module 805 may pass an indication 830 of cell dormancy to the dormancy determination module 810.

The dormancy determination module 810 may be means for determining, based on the indication 830 passed from the dormancy monitoring module 805, whether the at least one secondary carrier is dormant (e.g., aperiodically, for a predetermined time period, etc.). In one embodiment, it may be means for determining, based on a presence of the indication, that the at least one secondary carrier is dormant for a predetermined time period. In another embodiment, means for determining, based on an absence of the indication, that the at least one secondary carrier is dormant for a predetermined time period. In some embodiments, the dormancy determination module 810 may be means for determining, whether one or more secondary carriers from a first carrier group (e.g., MCG 510) and a second carrier group (e.g., SCG 520) are dormant for a predetermined time period. The dormancy determination module 810 may pass a dormancy determination 835 for the at least one secondary carrier to the CSI configuration module 815.

The CSI configuration module 815 may be means for determining a CSI reporting configuration for the at least one secondary carrier based at least in part on the determination that the at least one secondary carrier is dormant for a predetermined time period. The CSI configuration module 815 may receive the dormancy determination 835 and may determine the CSI reporting configuration based at least in part on the dormancy determination 835. In one embodiment, it may be means for suppressing CSI reporting for the at least one secondary carrier for one or more of periodic CSI reporting or aperiodic CSI reporting, or a combination thereof. In one embodiment, it may be means for reporting CSI based on channel measurements of the at least one secondary carrier during at least one time period when the at least one secondary carrier was non-dormant. In some cases, the CSI reporting configuration comprises averaging the channel measurements from the at least one time period. In some cases, the configuration may comprise reporting CSI based on measurements for the at least one secondary carrier during the predetermined time period.

In some embodiments, the CSI configuration module 815 may be means for determining a CSI reporting configuration for a dormant carrier for a multiple carrier configuration including a first carrier group (e.g., MCG 510) and a second carrier group (e.g., SCG 520). The CSI configuration module 815 may independently determine CSI reporting for secondary carriers of the first carrier group and for secondary carriers of the second carrier group according to one or more CSI reporting configurations. For example, the CSI configuration module 815 may report CSI for dormant secondary carriers of the MCG 510 to the MeNB according to a CSI reporting configuration associated with the MCG and report CSI for secondary carriers of the SCG 520 to the SeNB according to a CSI configuration associated with the SCG 520.

In some examples, the CSI reporting configuration determined by the CSI configuration module 715 may include a CSI-RS measurement configuration for the predetermined time period that the secondary carrier is dormant. For example, the CSI-RS measurement configuration may include reduced periodicity for CSI-RS signals, CSI-RS transmission based on a DRS configuration, measurement of CSI-RS signals for a reduced subset of antenna ports, or measurement of CSI-RS signals for a different secondary carrier, as described above.

Figure 9:
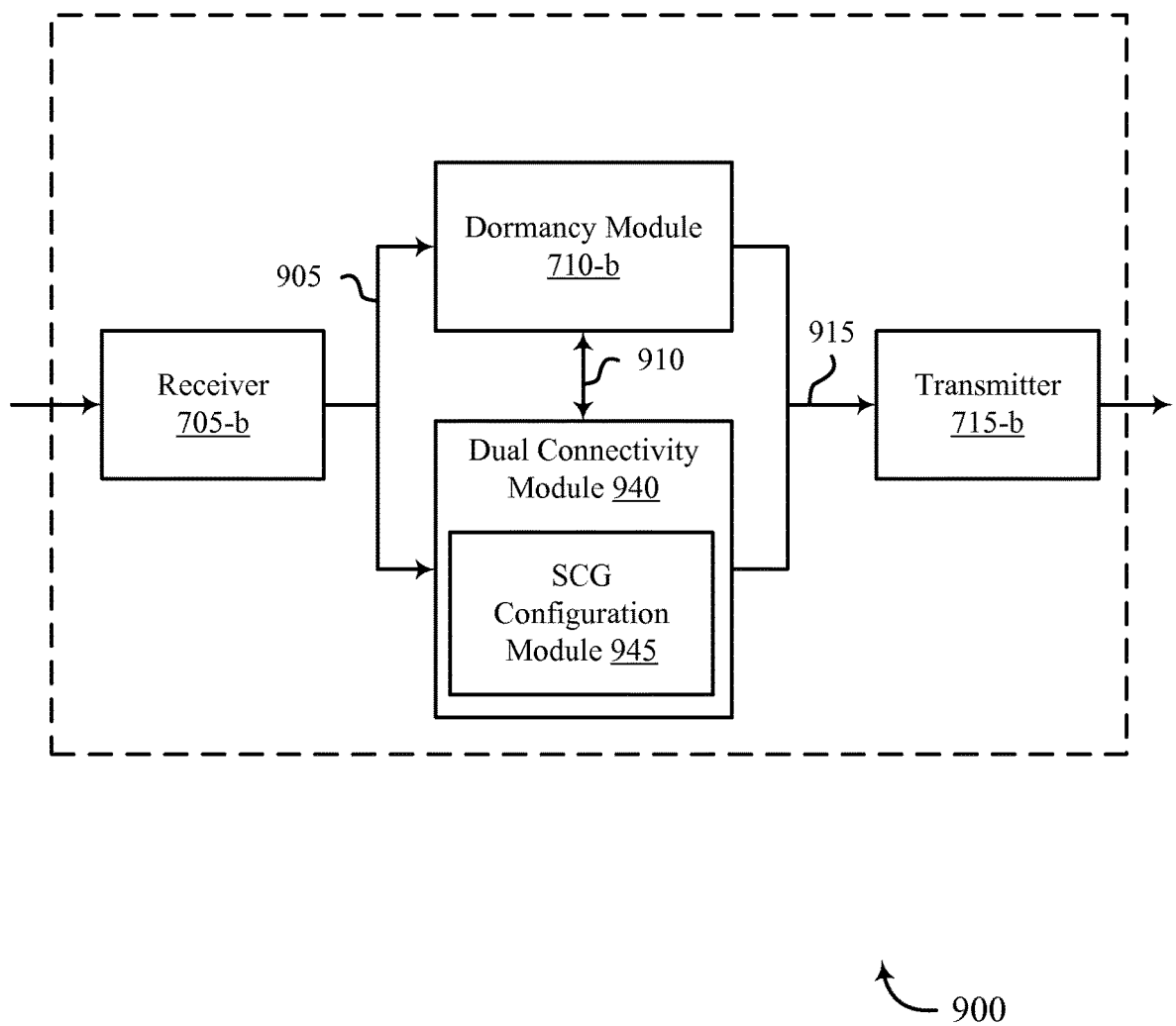
FIG. 9 shows a device for dynamic cell mode indication and reporting channel and interference feedback for dormant cells in a carrier aggregation environment in accordance with various embodiments.

FIG. 9 shows a device 900 for dynamic cell mode indication and reporting channel and interference feedback for dormant cells in a dual connectivity carrier aggregation environment in accordance with various embodiments. The device 900 may be an example of one or more aspects of a UE 115 described with reference to FIGS. 1, 2, 5, and 10. It may also be an example of devices 700 or 800 described with reference to FIG. 7 and FIG. 8. The device 900 may include a receiver 705-b, a dormancy module 710-b, and a transmitter 715-b, which may perform the functions described above with reference to the receivers 705, dormancy modules 710, and transmitters 715, respectively, of devices 700 and 800. The device 900 may also include a processor (not shown). The device may also include a dual connectivity module 940. Each of these components may be in communication with each other. For example, the receiver 705-b may communicate information 905 to dormancy module 710-b or dual connectivity module 940. The dormancy module 710-b or the dual connectivity module 940 may pass information 915 to the transmitter 715-b.

Dual connectivity module 940 may perform functions associated with operating in a carrier aggregation configuration including cells associated with non-collocated eNBs 105. For example, the dual connectivity module 940 may establish a connection with an MeNB 105 and may receive configuration for one or more SCells of an MCG 510 associated with the MeNB 105. Dual connectivity module 940 may receive configuration information for cells of an SCG 520 associated with an SeNB 105 and SCG configuration module 945 may manage configuration, activation, and deactivation of an SSCell and one or more SCells of the SCG 520. In some cases the configuration information may be conveyed by information 905 passed from the receiver 705-b. In some cases, the dual connectivity module 940 may communicate bi-directionally with dormancy module 710-b (e.g., connection information 910 may be passed between dual connectivity module 940 and dormancy module 710-b).

In some embodiments, SCG configuration module 945 may store one or more configurations for an SSCell of the SCG 520. The dual connectivity module 940 may activate or deactivate the SSCell based on signaling from the PCell. For example, the dual connectivity module 940 may receive (e.g., via information 905) a single bit in an RRC message, MAC CE, or embedded in a new or existing physical channel on the PCell for activation of the SSCell. The dual connectivity module 940 may retrieve the stored configuration from SCG configuration module 945 and activate the SSCell according to the stored configuration. Thus, the dual connectivity module 940 may activate the SSCell based on RRC signaling without receiving a full set of configuration parameters.

In some embodiments, the SCG configuration module 945 may store multiple configurations for the SSCell or SCG 520, and dual connectivity module 940 may activate or reconfigure the SSCell or SCG 520 based received signaling (e.g., using multiple bits) that indicates which of the stored configurations to use. In some instances, the SSCell may carry signaling related to configuration or activation/deactivation of the SSCell or SCG 520. For example, the SSCell may carry MAC signaling to deactivate SCells of SCG 520 or the SSCell itself. Additionally or alternatively, MAC or PHY layer signaling received from the SSCell may indicate the state of the SSCell or cells of the SCG 520

Dual connectivity module 940 may, in cooperation with dormancy module 710-b (e.g., using information 910), monitor for cell dormancy of SCells associate with the MCG 510 and SCG 520. For example, dormancy module 710-b may monitor a carrier of the PCell of the MCG 510 for indications of cell mode associated with SCells of the MCG 510 as described above with reference to FIGS. 4A and 5. In other cases, dormancy module 710-b may monitor carriers of the SCells of the MCG 510 for indications of cell dormancy as described above with reference to FIGS. 4B and 5. Similarly, dormancy module 710-b may monitor a carrier of the SSCell of the SCG 520, or carriers of the SCells, for indications of cell mode associated with SCells of the SCG 520 as described above with reference to FIGS. 4A, 4B, and 5. In some instances, dormancy indicators for SCells of the MCG 510 may be handled differently than dormancy indicators for SCells of the SCG 520. Thus, the dormancy module 710-b may monitor the PCell of the MCG 510 for dormancy indicators of SCells of the MCG 510 while monitoring each SCell of the SCG 520. As described above, dormancy module 710-b may monitor for cell mode indicators for configured SCells, or activated SCells only, in some cases.

Figure 10:
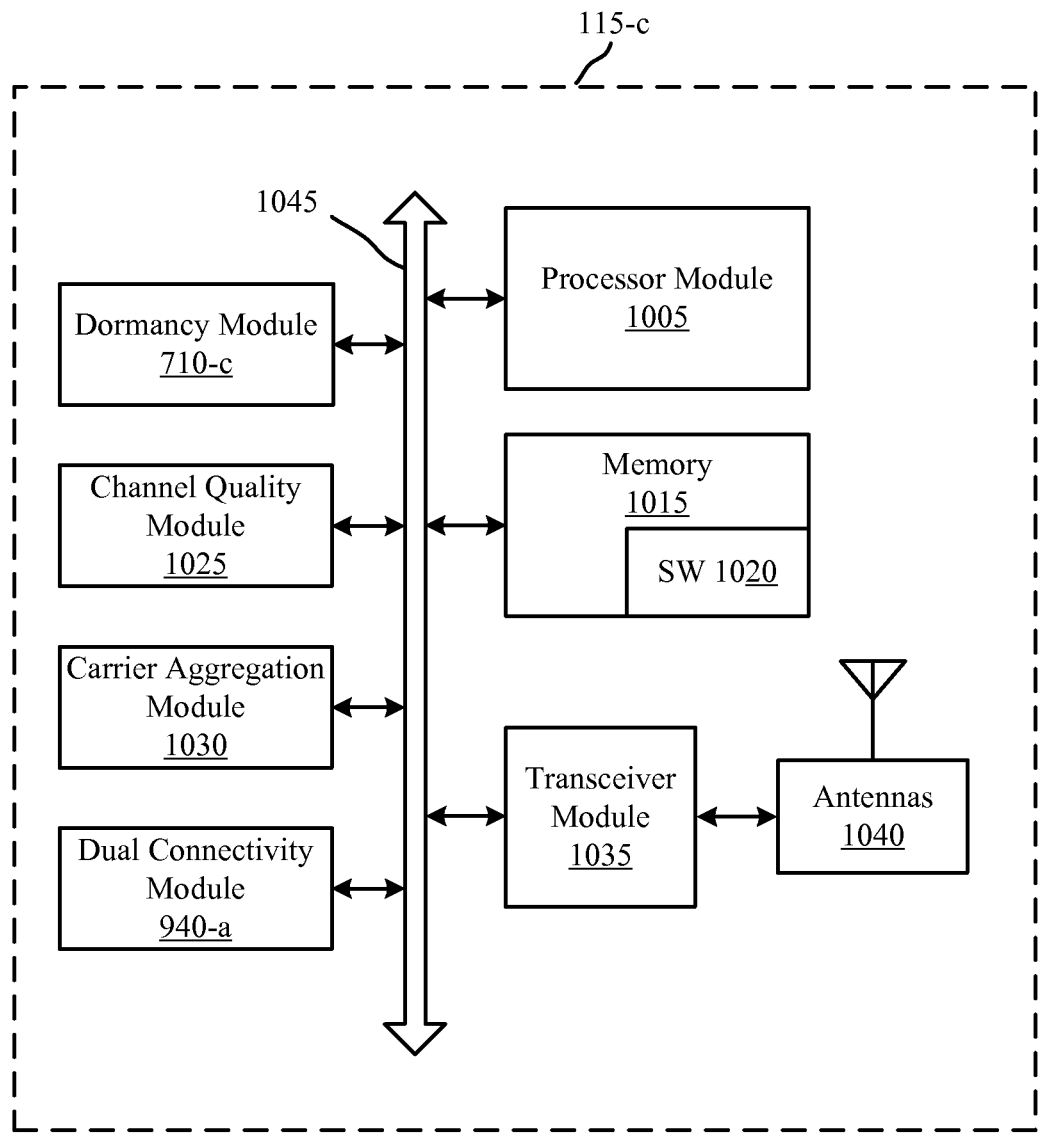
FIG. 10 shows a wireless communications device for dynamic cell mode indication and reporting channel and interference feedback for dormant cells in a carrier aggregation environment in accordance with various embodiments.

FIG. 10 shows a system 1000 for dynamic cell mode indication and reporting channel and interference feedback for dormant cells in a carrier aggregation environment in accordance with various embodiments. System 1000 may include a UE 115-c, which may be an example of the UEs 115 of FIG. 1, 2, or 5.

The UE 115-c may generally include components for bi-directional voice and data communications including components for transmitting communications and components for receiving communications. The UE 115-c may include antenna(s) 1040, a transceiver module 1035, a processor module 1005, and memory 1015 (including software (SW) 1020), which each may communicate, directly or indirectly, with each other (e.g., via one or more buses 1045). The transceiver module 1035 may be configured to communicate bi-directionally, via the antenna(s) 1040 or one or more wired or wireless links, with one or more networks, as described above. For example, the transceiver module 1035 may be configured to communicate bi-directionally with base stations 105 with reference to FIG. 1, 2 or 5. The transceiver module 1035 may include a modem configured to modulate the packets and provide the modulated packets to the antenna(s) 1040 for transmission, and to demodulate packets received from the antenna(s) 1040. While the UE 115-c may include a single antenna 1040, the UE 115-c may have multiple antennas 1040 capable of concurrently transmitting or receiving multiple wireless transmissions. The transceiver module 1035 may be capable of concurrently communicating with one or more base stations 105 via multiple component carriers.

The UE 115-c may include a dormancy module 710-c, which may perform the functions described above for the dormancy modules 710 of devices 700, 800, and 900 of FIGS. 7, 8, and 9. The UE 115-c may also include a channel quality module 1025 and a carrier aggregation module 1030. The channel quality module 1025 may perform channel measurements and interference measurements for configured carriers. For example, the channel quality module 1025 may perform measurements of carriers of SCells for CSI reporting as described above with reference to FIGS. 6A and 6B. The carrier aggregation module 1030 may perform functions associated with configuring UE 115-c for carrier aggregation. For example, the carrier aggregation module 1030 may process messaging (e.g., RRC, MAC, etc.) for configuring one or more SCells for the UE 115-c including configuring scheduling and activation/deactivation of the one or more SCells. The UE 115-c may include a dual connectivity module 940-a, which may perform the functions described above for the dual connectivity module 940 of the device 900 of FIG. 9.

The memory 1015 may include random access memory (RAM) and read-only memory (ROM). The memory 1015 may store computer-readable, computer-executable software/firmware code 1020 containing instructions that are configured to, when executed, cause the processor module 1005 to perform various functions described herein (e.g., call processing, database management, processing of carrier mode indicators, reporting CSI for dormant SCells according to a CSI configuration, etc.). Alternatively, the software/firmware code 1020 may not be directly executable by the processor module 1005 but be configured to cause a computer (e.g., when compiled and executed) to perform functions described herein. The processor module 1005 may include an intelligent hardware device, (e.g., a central processing unit (CPU), a microcontroller, an application-specific integrated circuit (ASIC), etc.).

Figure 11:
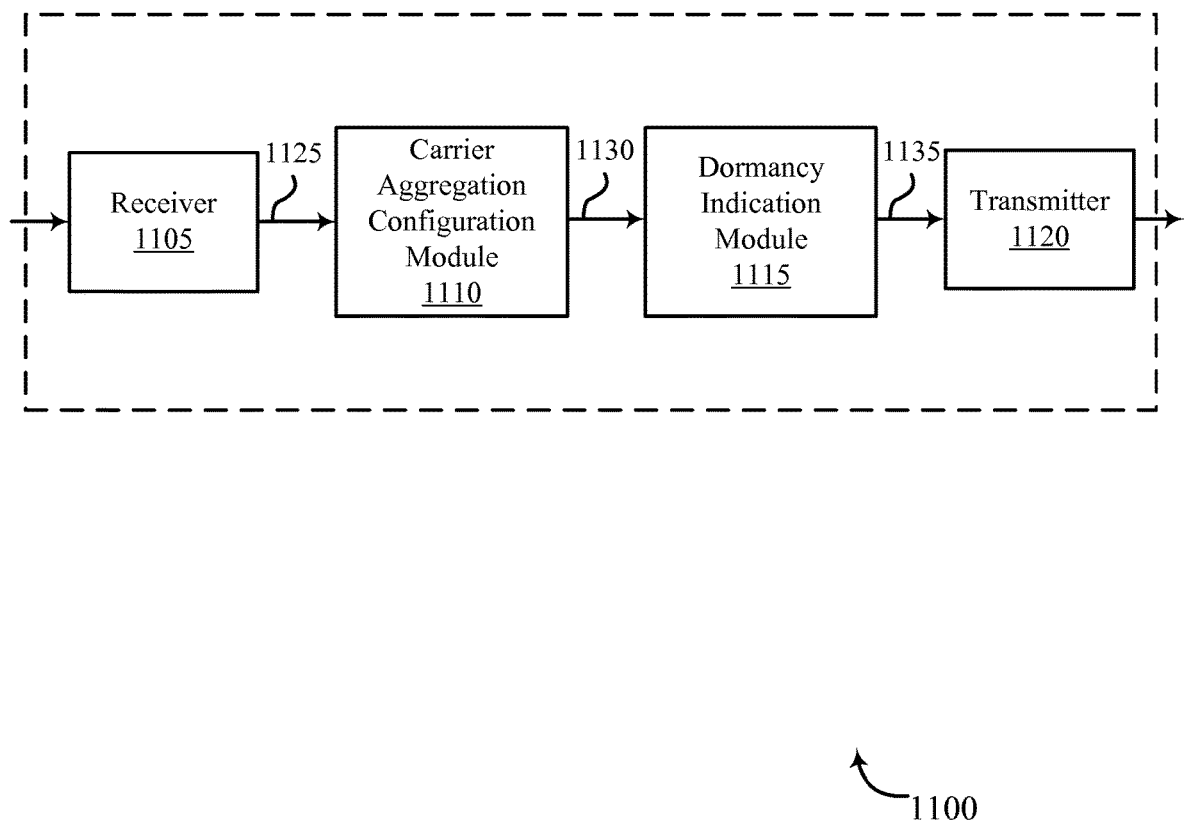
FIG. 11 shows a device for dynamic cell mode indication for dormant cells in a carrier aggregation environment in accordance with various embodiments.

FIG. 11 shows a device 1100 for dynamic cell mode indication and reporting channel and interference feedback for dormant cells in a carrier aggregation environment in accordance with various embodiments. The device 1100 may be an example of one or more aspects of an eNB 105 described with reference to FIGS. 1, 2, and 5. The device 1100 may include a receiver 1105, a carrier aggregation configuration module 1110, a dormancy indication module 1115 or a transmitter 1120. The device 1100 may also include a processor (not shown). Each of these components may be in communication with each other.

The receiver 1105 may receive information such as packets, user data, or control information associated with various information channels (e.g., control channels, data channels, etc.). The receiver 1105 may receive the various information channels over one or more carriers. The received information 1125 may be passed on to the carrier aggregation configuration module 1110, and to other components of the device 1100.

The carrier aggregation configuration module 1110 may be means for establishing, at a base station 105, a configuration for communication with one or more UEs 115 using a plurality of carriers including a primary carrier (e.g., PCell) and one or more secondary carriers (e.g., SCells). The carrier aggregation configuration module 1110 may perform functions associated with configuring carriers (e.g., PCells, SSCells, or SCells) and UEs 115 for carrier aggregation. For example, the carrier aggregation configuration module 1110 may process messaging (e.g., RRC, MAC, etc.) for configuring the one or more UEs for carrier aggregation using one or more SCells including configuring scheduling and activation/deactivation of the one or more SCells. In some cases, the carrier aggregation configuration module 1110 may adjust a schedule for transmitting reference signals (e.g., CRS, CSI-RS, PRS, etc.), such as to a UE 115. Adjusting the schedule for transmitting reference signals may be based on a secondary carrier being dormant. In some cases, the carrier aggregation configuration module 1110 may reduce a frequency (i.e., temporal frequency) of reference signal transmission.

In some embodiments, the carrier aggregation configuration module 1110 may manage carrier aggregation for UEs configured for carrier aggregation using cells associated with non-collocated base station groups or eNBs 105. For example, the carrier aggregation configuration module 1100 may be implemented in an MeNB and may provide functionality (e.g., configuration, activation and deactivation, etc.) for supporting a PCell and one or more SCells of an MCG associated with the MeNB. The carrier aggregation configuration module 1110 may provide functionality for interfacing with one or more SeNBs and managing configuration of the SSCell or SCG (e.g., configuration, activation and deactivation, etc.) associated with the SeNBs.

In other examples, the carrier aggregation configuration module 1100 may be implemented in an SeNB and may provide functionality (e.g., configuration, activation and deactivation, etc.) for supporting an SSCell and one or more SCells of an SCG associated with the SeNB. The carrier aggregation configuration module 1110 may provide functionality for communication between the SeNB and one or more MeNBs for providing dual connectivity for UEs served by the SeNB.

The dormancy indication module 1115 may be means for indicating to the one or more UEs that at least one secondary carrier from the one or more secondary carriers is dormant, such as based on one or more signals 1130 received from the carrier aggregation configuration module 1110. In one embodiment, it may be means for processing downlink control information (DCI) for transmission in a search space associated with the secondary carrier. In some cases, the DCI is transmitted according to DCI Format 1C. In one embodiment, the dormancy indication module 1115 may be means for omitting transmission of an indication that the at least one secondary carrier from the one or more secondary carriers is non-dormant for a predetermined time period. The dormancy indication module 1115 may determine time periods when an SCell is dormant based on, for example, scheduling information for the one or more UEs.

The transmitter 1120 may transmit the one or more signals 1135 received from other components of the device 1100. In some embodiments, the transmitter 1120 may be collocated with the receiver 1105 in a transceiver module. The transmitter 1120 may include a single antenna, or it may include a plurality of antennas. The transmitter 1120, in coordination with the dormancy indication module 1115, may be means for transmitting an indication that the at least one secondary carrier from the one or more secondary carriers is dormant for a predetermined time period. In some cases, it may be means for transmitting the indication by a carrier different from the secondary carrier. For example, a PCell may transmit an indication that an SCell is dormant. In other cases, it may be means for transmitting a dormancy indication for an SCell on a secondary carrier associated with the SCell.

Figure 12:
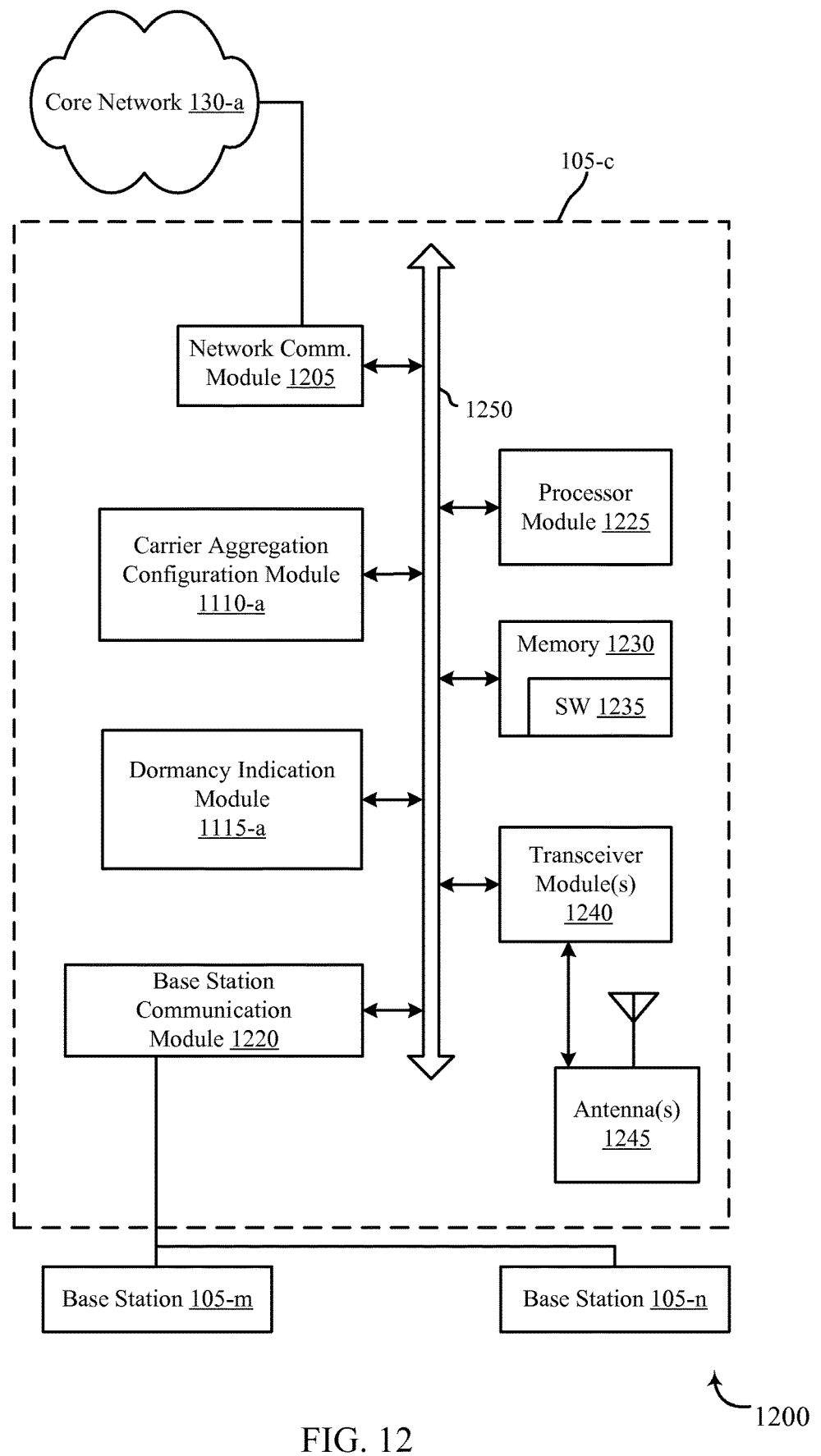
FIG. 12 shows a base station for dynamic cell mode indication for dormant cells in a carrier aggregation environment in accordance with various embodiments.

FIG. 12 shows a communications system 1200 that may be configured for dynamic cell mode indication and reporting channel and interference feedback for dormant cells in a carrier aggregation environment in accordance with various embodiments. System 1200 may be an example of aspects of the systems 100, 200, or 500 of FIG. 1, FIG. 2, or FIG. 5. System 1200 includes eNB 105-c, which may incorporate the functionality and components of device 1100, of FIG. 11.

In some cases, the eNB 105-c may have one or more wired backhaul links. The eNB 105-c may have a wired backhaul link (e.g., S1 interface, etc.) to the core network 130-a. The eNB 105-c may also communicate with other base stations 105, such as base station 105-m and base station 105-n via inter-base station communication links (e.g., X2 interface, etc.). Each of the base stations 105 may communicate with UEs 115 using the same or different wireless communications technologies. In some cases, eNB 105-c may communicate with other base stations such as 105-m or 105-n utilizing base station communication module 1220. In some embodiments, base station communication module 1220 may provide an X2 interface within an LTE/LTE-A wireless communication network technology to provide communication between some of the base stations 105. In some embodiments, eNB 105-c may communicate with other base stations through core network 130-a. In some cases, eNB 105-c may communicate with the core network 130-a through network communications module 1205.

The components for eNB 105-c may be configured to implement aspects discussed above with respect to eNBs 105 of FIG. 1, FIG. 2, or FIG. 5 or device 1100 of FIG. 11, and some aspects may not be repeated here for the sake of brevity. For example, the eNB 105-c may be configured to indicate to UEs 115 served by secondary cells whether one or more of the secondary cells are dormant. It may include a carrier aggregation configuration module 1110-a and a dormancy indication module 1115-a that may examples of the carrier aggregation configuration module 1110 and dormancy indication module 1115 of device 900, respectively.

The eNB 105-c may include a processor module 1225, memory 1230 (including software (SW) 1235), transceiver modules 1240, and antenna(s) 1245, which each may be in communication, directly or indirectly, with each other (e.g., over bus system 1250). The transceiver modules 1240 may be configured to communicate bi-directionally, via the antenna(s) 1245, with the UEs 115, which may be multimode devices. The transceiver module 1240 (or other components of the eNB 105-c) may also be configured to communicate bi-directionally, via the antennas 1245, with one or more other base stations (not shown). The transceiver module 1240 may include a modem configured to modulate the packets and provide the modulated packets to the antennas 1245 for transmission, and to demodulate packets received from the antennas 1245. The eNB 105-b may include multiple transceiver modules 1240, each with one or more associated antennas 1245. The transceiver module may be an example of a combined receiver 1105 and transmitter 1120 of FIG. 11.

The memory 1230 may include random access memory (RAM) and read-only memory (ROM). The memory 1230 may also store computer-readable, computer-executable software code 1235 containing instructions that are configured to, when executed, cause the processor module 1225 to perform various functions described herein (e.g., selecting coverage enhancement techniques, call processing, database management, message routing, etc.). Alternatively, the software 1235 may not be directly executable by the processor module 1225 but be configured to cause the computer, e.g., when compiled and executed, to perform functions described herein.

The processor module 1225 may include an intelligent hardware device, e.g., a central processing unit (CPU), a microcontroller, an application-specific integrated circuit (ASIC), etc. The processor module 1225 may include various special purpose processors such as encoders, queue processing modules, base band processors, radio head controllers, digital signal processors (DSPs), and the like.

According to the architecture of FIG. 12, the eNB 105-c may further include a base station communication module 1220. The base station communication module 1220 may manage communications with other base stations 105. The communications management module may include a controller or scheduler for controlling communications with UEs 115 in cooperation with other base stations 105. For example, the base station communication module 1220 may perform scheduling for transmissions to UEs 115 or various interference mitigation techniques such as beamforming or joint transmission.

Figure 13A:
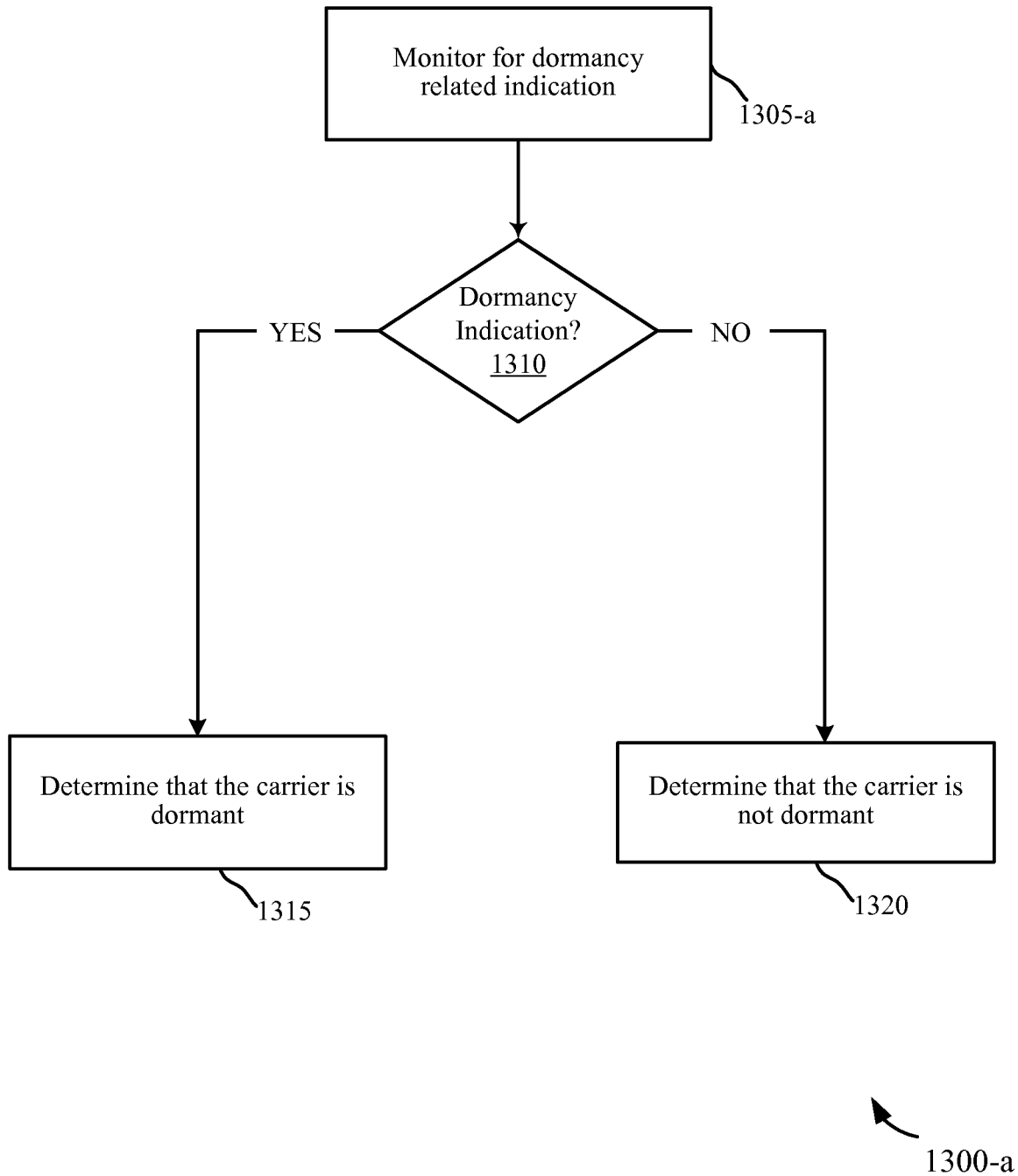
FIGS. 13A and 13B show flowcharts illustrating methods for dynamic cell mode indication in accordance with various embodiments.
Figure 13B:
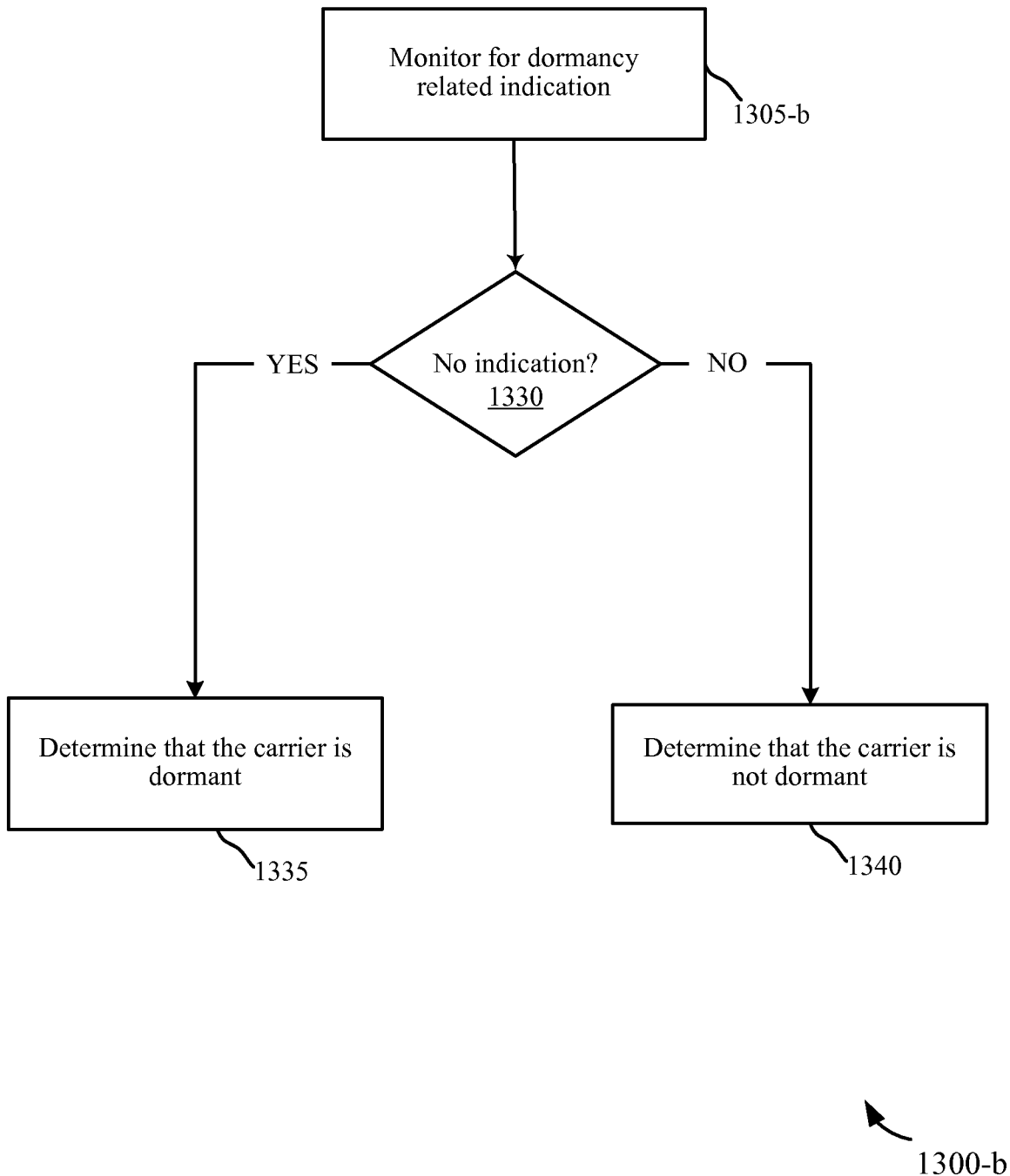

FIGS. 13A and 13B show flowcharts 1300-a and 1300-b illustrating methods for dynamic cell mode indication in a carrier aggregation environment in accordance with various embodiments. The steps of flowcharts 1300-a and 1300-b may be accomplished by a UE 115 of FIGS. 1, 2, 5 and 10 or devices 700, 800, or 900 of FIGS. 7-9.

At blocks 1305-a and 1305-b of flowcharts 1300-a and 1300-b, a UE may monitor for a dormancy indication. In one embodiment, this may include monitoring a carrier from among a primary carrier and one or more secondary carriers for an indication (e.g., periodic, aperiodic, etc.) that at least one secondary carrier is dormant. In some cases, a predetermined time period corresponding to a periodic indication may include one or more radio frames or subframes. In one embodiment, the monitoring may be accomplished by the dormancy monitoring module 805.

In some cases, the UE 115 may be configured for carrier aggregation according to a multiple carrier configuration including a first carrier group (e.g., MCG) associated with a first base station (e.g., MeNB) and a second carrier group (e.g., SCG) being associated with a second base station (e.g., SeNB). The first carrier group may include a primary carrier only or the primary carrier and a first set of secondary carriers. The second carrier group may include a second set of secondary carriers. The UE 115 may monitor one or more carriers for cell dormancy of secondary carriers from the first carrier group or second carrier group.

In some cases, monitoring the carrier may comprise monitoring a search space of the carrier at a predefined time interval for downlink control information (DCI) comprising the indication. In some cases, the at least one secondary carrier itself is monitored for the indication. In other cases, the primary carrier (e.g., PCell for carriers of the MCG) or special secondary carrier (e.g., SSCell for carriers of an SCG) is monitored for dormancy indicators for the at least one secondary carrier. In one embodiment, monitoring for the indication is based on an activation state of the at least one secondary carrier.

At block 1310, the UE may determine whether an indication has been received. In one embodiment the dormancy determination module 810 may determine, based on the indication, whether the at least one secondary carrier is dormant (e.g., aperiodically, for a predetermined time period, or for selected subframes during a predetermined time period, etc.). In dual connectivity carrier aggregation configurations, the at least one secondary carrier may be a secondary carrier of the first carrier group or the secondary carrier group.

If a dormancy indication for the at least one secondary carrier is received at block 1310, the UE may determine that the at least one secondary carrier is dormant at block 1315. In one embodiment, the dormancy for the at least one secondary carrier is determined at block 1315 by the presence of a transmitted dormancy indicator at block 1310. The dormancy indication may indicate that the at least one secondary carrier is dormant aperiodically, for a predetermined time period, or for a portion of a predetermined time period (e.g., subframes of a radio frame, etc.).

If an indication is received at block 1310 that indicates that the at least one secondary carrier is not dormant for the predetermined time period, the UE may determine that the at least one secondary carrier is not dormant at block 1320. In some cases, the lack of a dormancy indication at block 1310 may indicate that the at least one secondary carrier is not dormant for a predetermined time period at block 1320.

At block 1330 of flowchart 1300-*b*, the UE may determine that an absence of a dormancy related indication may be interpreted as an indication of dormancy. For example, the UE may consider that the absence of DCI information related to dormancy for a secondary carrier of the one or more secondary carriers means that the carrier will be dormant for a predetermined time period.

At block 1335, if an absence of an indication is detected for at least one secondary carrier of the one or more secondary carriers, the UE may determine that the at least one secondary carrier is dormant for the predetermined time period.

If an indication related to dormancy is received at block 1330 for at least one secondary carrier of the one or more secondary carriers, the UE may determine that the at least one secondary carrier is not dormant at block 1340. In some cases, the indication related to dormancy may indicate that the at least one secondary carrier is dormant for a predetermined time period and may include information for sub-periods of the predetermined time period. For example, the indication may indicate subframes within a radio frame for which the at least one secondary carrier is active. The UE may determine that the at least one secondary carrier is dormant for the other subframes. Additionally or alternatively, the indication related to dormancy may indicate that the at least one secondary carrier is dormant aperiodically.

Figure 14:
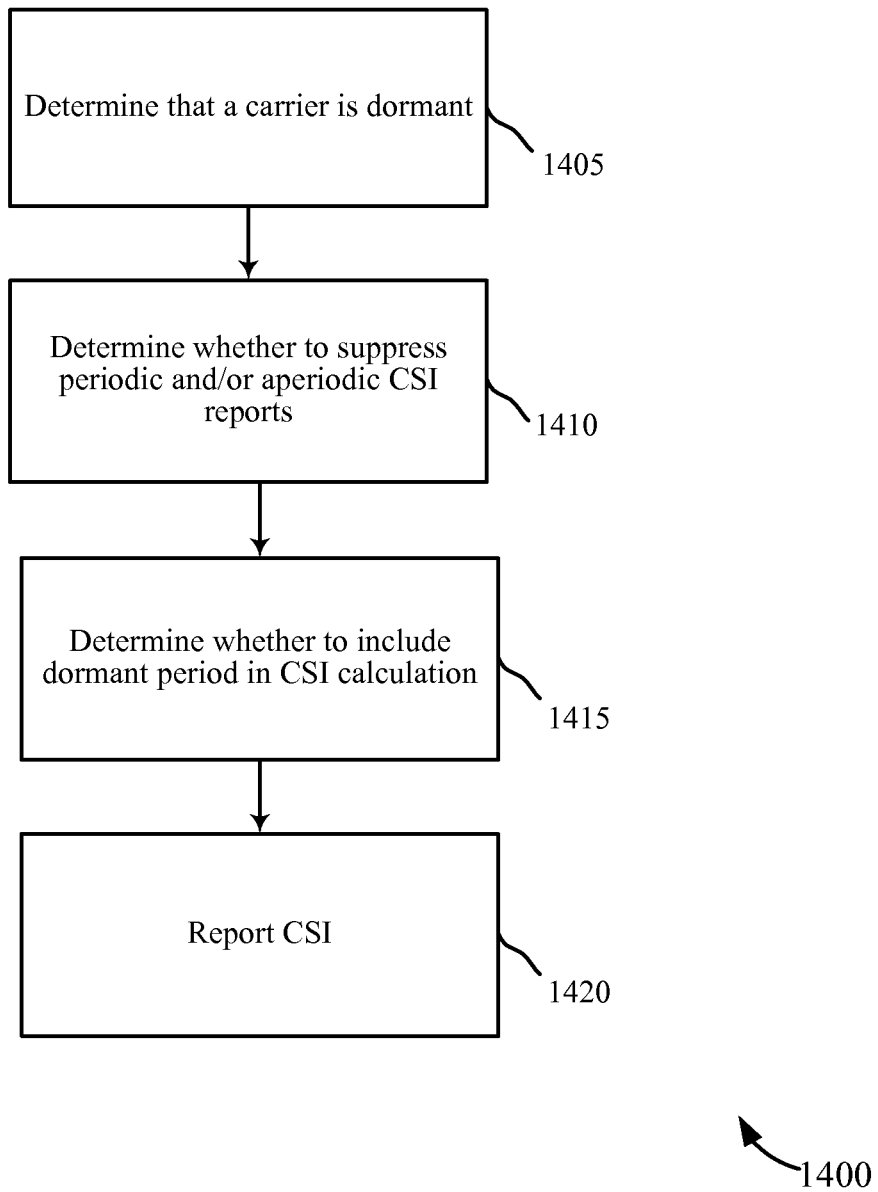
FIG. 14 shows a flowchart illustrating a method for configuring a CSI report for dormant secondary cells in accordance with various embodiments.

FIG. 14 is a flowchart 1400 illustrating a method for reporting channel and interference feedback for dormant cells in a carrier aggregation environment in accordance with various embodiments. The steps herein may be accomplished by the UE 115s of FIG. 1, 2, 5, or 10 or devices 700, 800, or 900 of FIGS. 7-9.

At block 1405, the UE 115 may determine that at least one secondary carrier is dormant. The UE 115 may determine that the at least one secondary carrier is dormant, for example, based on an indication of cell dormancy or based on inferring cell dormancy from signals in a carrier transmitted by the secondary cell.

In some cases, the UE 115 may be configured for carrier aggregation according to a multiple carrier configuration including a first carrier group (e.g., MCG) associated with a first base station (e.g., MeNB) and a second carrier group (e.g., SCG) being associated with a second base station (e.g., SeNB). The first carrier group may include a primary carrier only or the primary carrier and a first set of secondary carriers. The second carrier group may include a second set of secondary carriers. The at least one secondary carrier may include secondary carriers of the first carrier group or second carrier group.

At block 1410, the UE 115 may determine whether to suppress periodic or aperiodic CSI reports for the at least one secondary carrier. In one embodiment, the UE 115 may suppress CSI reporting for both periodic and aperiodic CSI reporting. In other embodiments, the UE 115 may suppress aperiodic CSI reports while reporting periodic CSI. In yet other embodiments, the UE 115 may report both periodic and aperiodic CSI for the at least one secondary carrier even when the at least one carrier is dormant.

At block 1415, the UE 115 may determine whether to include a dormant period in a CSI calculation for a CSI report for the at least one secondary carrier. In some embodiments, the UE 115 may report CSI for the at least one secondary carrier using the latest channel measurements including for dormant periods. In some embodiments, the UE 115 may report CSI for dormant periods of the at least one secondary carrier using channel measurements made during at least one time period when the at least one secondary carrier was non-dormant. Alternatively, CSI for channel measurements and interference reporting may be handled differently. For example, the UE may report interference measurements (e.g., based on IMR, etc.) based on measurements for the dormant period while either suppressing CSI reporting of channel measurements or using channel measurements from a time period when the carrier was not dormant.

At block 1420, the UE 115 may report CSI based on the determinations of steps 1410 and 1415. In some cases, reporting CSI for the at least one secondary carrier may include averaging channel or interference measurements from at least one time period. For example, the UE 115 may report CSI for channel measurements averaged from subframes when the at least one secondary carrier was not dormant. In some embodiments, the UE 115 may report CSI for interference measurements averaged from both dormant and non-dormant subframes.

Figure 15A:
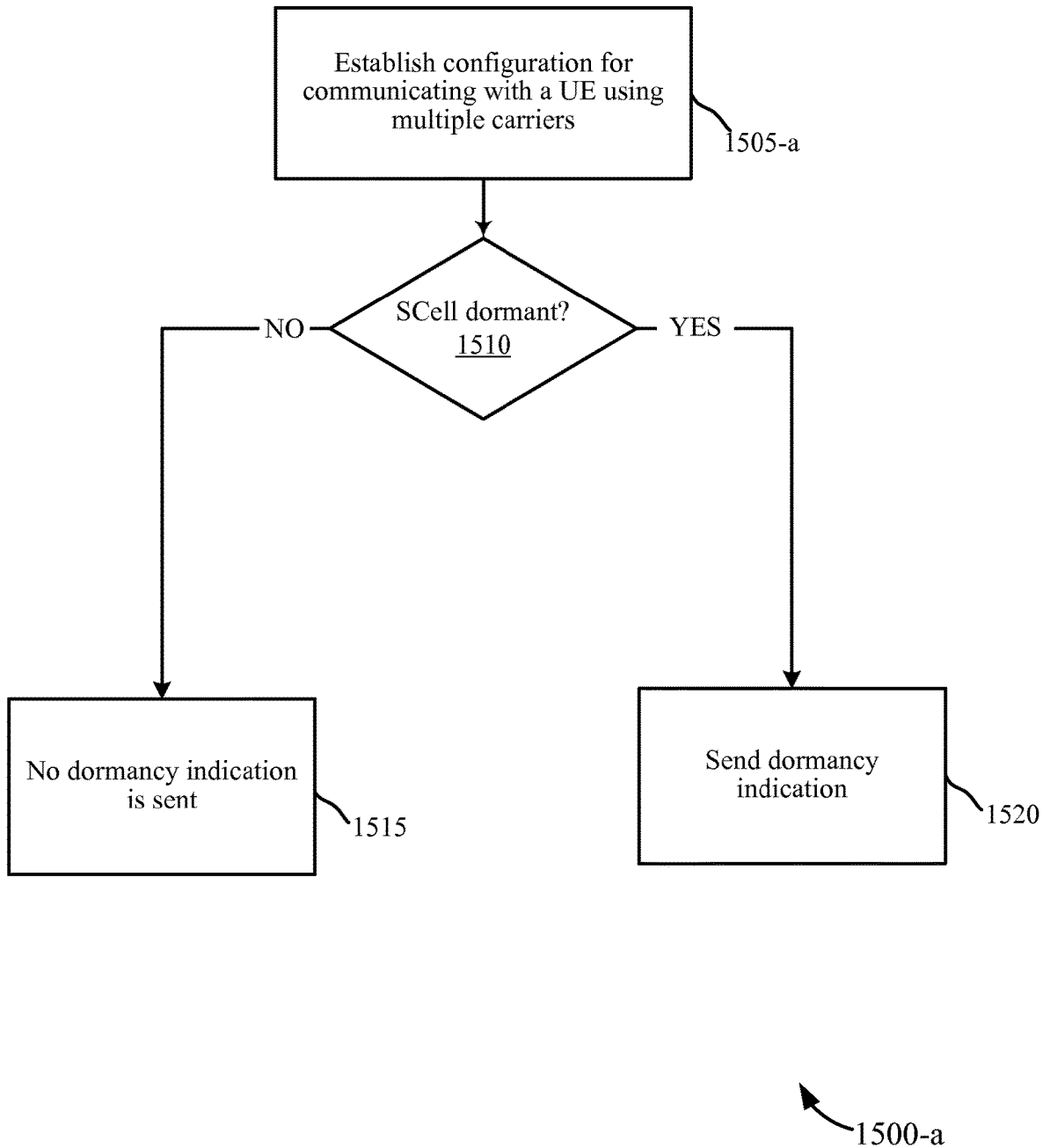
FIGS. 15A and 15B show flowcharts illustrating methods for dynamic cell mode indication for dormant cells at a base station in accordance with various embodiments.
Figure 15B:
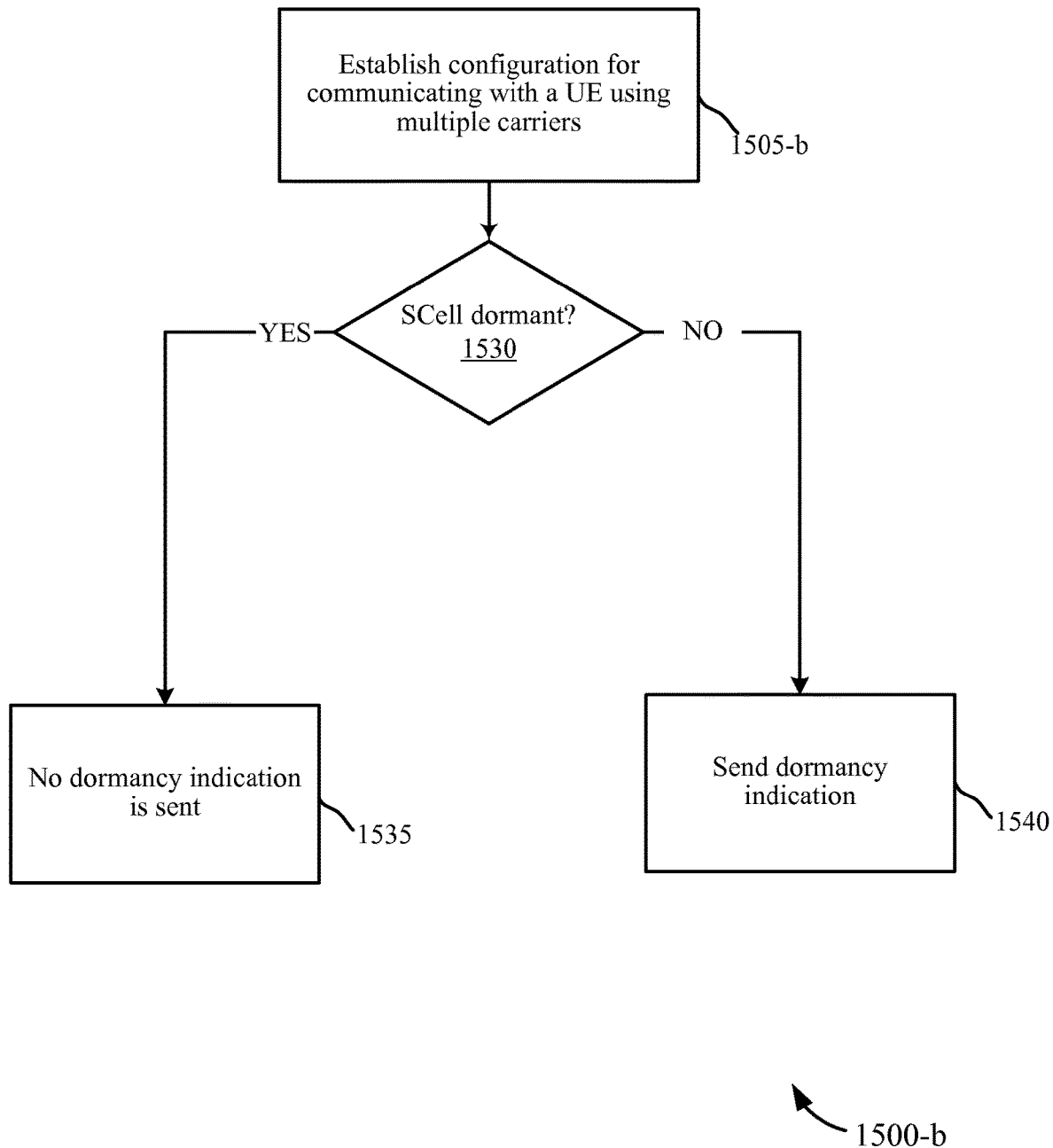

FIGS. 15A and 15B are flowcharts 1500-*a* and 1500-*b* illustrating methods for dynamic cell mode indication in a carrier aggregation environment in accordance with various embodiments. The steps in flowcharts 1500-*a* and 1500-*b* may be accomplished by components of a base station 105 with reference to FIG. 1, 2, 5 or 12 or device 1100 with reference to FIG. 11.

At blocks 1505-*a* and 1505-*b* of flowcharts 1500-*a* and 1500-*b*, respectively, an eNB 105 serving a UE 115 may establish a configuration for communication with the UE 115 using multiple carriers. In one embodiment, the serving eNB may establish a configuration for communication with at least one UE using a plurality of carriers including a primary carrier, a special secondary carrier, or one or more secondary carriers.

In some cases, the eNB 105 may operate to provide dual connectivity carrier aggregation for one or more UEs. For example, UEs 115 may be configured for carrier aggregation according to a multiple carrier configuration including a first carrier group (e.g., MCG) associated with a first base station (e.g., MeNB) and a second carrier group (e.g., SCG) being associated with a second base station (e.g., SeNB). The first carrier group may include a primary carrier only or the primary carrier and a first set of secondary carriers. The second carrier group may include a second set of secondary carriers. The steps of flowcharts 1500-*a* and 1500-*b* may be performed by an MeNB for secondary carriers of an MCG or by an SeNB for secondary carriers of an SCG, for example.

Flowchart 1500-*a* may illustrate indication of cell mode where the cell mode may default to active mode. At block 1510 of flowchart 1500-*a*, the eNB 105 may determine whether a secondary carrier (e.g., an SCell) will be dormant for a predetermined time period (e.g., one or more frames or subframes, etc.). If the secondary carrier is dormant at block 1510, the eNB 105 may omit sending of an indication at block 1515.

If is determined that the secondary carrier will be dormant for portions or all of the predetermined time period at block 1510, the eNB 105 may send an indication to UEs that the secondary carrier is dormant. The indication may be transmitted using the secondary carrier itself, or may be transmitted over a carrier different from the secondary carrier (e.g., PCell or SSCell). In embodiments, the dormancy indicator is transmitted at block 1520 in cases where the secondary carrier is dormant for portions of the predetermined time period (e.g., frames or subframes of the predetermined time period). In one embodiment, these steps may be accomplished by the dormancy indication module 1115. In some cases, this may comprise transmitting DCI in a search space of the carrier monitored for the dormancy indication. The search space may comprise a common search space for the at least one UE. In one embodiment, the DCI is transmitted according to DCI Format 1C.

Flowchart 1500-*b* may illustrate indication of cell mode where the cell mode may default to dormant mode. If the secondary carrier is dormant at block 1530 of flowchart 1500-*b*, the eNB 105 may, at block 1535, omit sending the indication for the secondary carrier for the predetermined time period.

If is determined that the secondary carrier is not dormant for all or portions of the predetermined time period at block 1530, the eNB 105 may send an indication to UEs that the secondary carrier is not dormant. The indication may be transmitted using the secondary carrier itself, or may be transmitted over a carrier different from the secondary carrier (e.g., PCell or SSCell). In embodiments, the dormancy indicator is transmitted at block 1520 in cases where the secondary carrier is dormant for portions of the predetermined time period (e.g., frames or subframes of the time period) and active for other portions. In one embodiment, these steps may be accomplished by the dormancy indication module 1115. In some cases, this may comprise transmitting DCI in a search space of the carrier monitored for the dormancy indication. The search space may comprise a common search space for the at least one UE. In one embodiment, the DCI is transmitted according to DCI Format 1C.

In some embodiments, the carrier used for transmission of the dormancy indication at blocks 1520 and 1540 may be independent of a carrier used for scheduling information. For example, the dormancy indication may be transmitted on a PCell or SSCell even when the secondary carrier is configured for self-scheduling for one or more UEs served by the secondary carrier, or may be transmitted on the secondary carrier even when the secondary carrier is configured for cross-carrier scheduling for one or more UEs served by the secondary carrier.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communications, comprising:
   identifying a multiple carrier configuration, the multiple carrier configuration including a first carrier group and a second carrier group,
   the first carrier group being associated with a first base station and including a primary carrier only or the primary carrier and a first set of secondary carriers, and
   the second carrier group being associated with a second base station and including a second set of secondary carriers, wherein one or more secondary carriers of the first set of secondary carriers or the second set of secondary carriers aperiodically transition between being dormant and non-dormant;
   monitoring the one or more secondary carriers for a cell mode indicator indicating that a secondary carrier from at least one of the first set of secondary carriers or the second set of secondary carriers is dormant;
   determining that a first secondary carrier from at least one of the first set of secondary carriers or the second set of secondary carriers is dormant based on a received cell mode indicator;
   determining that a second secondary carrier from at least one of the first set of secondary carriers or the second set of secondary carriers is aperiodically dormant based on an absence of detecting information related to dormancy over the one or more secondary carriers during the monitoring; and
   transmitting a channel feedback report for the one or more secondary carriers while the first and second secondary carriers are dormant, wherein the channel feedback report comprises channel interference feedback that is based on measurements of resources of the one or more secondary carriers while the first and second secondary carriers are dormant and channel quality feedback that is based on channel measurements of the one or more secondary carriers from a previous non-dormant period of the first and second secondary carriers.

2. The method of claim 1, wherein the monitoring comprises:
   monitoring the one or more secondary carriers from the first carrier group for cell mode indicators associated with the one or more secondary carriers of the first set of secondary carriers.

3. The method of claim 1, wherein
   the second carrier group comprises a special secondary carrier, and
   wherein the monitoring comprises monitoring the special secondary carrier for cell mode indicators associated with the one or more secondary carriers of the second set of secondary carriers.

4. The method of claim 1, wherein
   the second carrier group comprises a special secondary carrier, and
   wherein the monitoring comprises monitoring the one or more secondary carriers of the second set of secondary carriers for cell mode indicators associated with the one or more secondary carriers of the second set of secondary carriers.

5. The method of claim 1, wherein the monitoring comprises monitoring one or more search spaces of at least a first carrier of the first carrier group and at least a second carrier of the second carrier group at predefined time intervals for downlink control information (DCI) comprising the indications of cell dormancy.

6. The method of claim 1, wherein monitoring indications of cell dormancy for the multiple carrier configuration is based on activation states of secondary carriers of the first and second sets of secondary carriers.

7. The method of claim 1, further comprising:
receiving an indication of cell dormancy associated with the first secondary carrier, and
wherein determining that the first secondary carrier is dormant comprises determining the first secondary carrier is dormant for a predetermined period of time.

8. The method of claim 1, further comprising:
receiving an indication of cell dormancy associated with the first secondary carrier, and
wherein determining that the first secondary carrier is dormant comprises determining the first secondary carrier is dormant until a next cell dormancy indication is received.

9. A method of wireless communications, comprising:
determining, at a UE, a multiple carrier configuration including a first carrier group and a second carrier group,
the first carrier group being associated with a first base station and including a primary carrier only or the primary carrier and a first set of secondary carriers, and
the second carrier group being associated with a second base station and including a second set of secondary carriers, wherein one or more secondary carriers from the first set of secondary carriers or the second set of secondary carriers aperiodically transitions between being dormant and non-dormant;
monitoring the one or more secondary carriers for a cell mode indicator indicating that a secondary carrier from at least one of the first set of secondary carriers or the second set of secondary carriers is dormant;
determining that a first secondary carrier from at least one of the first set of secondary carriers or the second set of secondary carriers is dormant based on a received cell mode indicator;
determining that a second secondary carrier from at least one of the first set of secondary carriers or the second set of secondary carriers is aperiodically dormant based at least in part on detecting an aperiodic transition between being non-dormant and being dormant from an absence of information related to dormancy for the second secondary carrier;
determining a channel state information (CSI) reporting configuration for the first and second secondary carriers based at least in part on the determining that the first and second secondary carriers are dormant; and
performing CSI reporting according to the CSI reporting configuration, wherein the CSI reporting configuration comprises a first antenna port configuration for reporting CSI when the first and second secondary carriers are dormant and a second antenna port configuration for reporting CSI when the first and second secondary carriers are non-dormant, the first antenna port configuration being different than the second antenna port configuration.

10. The method of claim 9, wherein performing CSI reporting further comprises:
determining whether the first and second secondary carriers are associated with the first base station or the second base station; and
performing CSI reporting for the first and second secondary carriers to the first base station or to the second base station based on the determined association and according to the CSI reporting configuration.

11. The method of claim 9, wherein the first type of CSI comprises periodic CSI reporting and the second type of CSI comprises aperiodic CSI reporting.

12. The method of claim 9, wherein the CSI reporting configuration further comprises averaging the channel measurements from at least one time period.

13. The method of claim 9, further comprising:
determining a CSI reference signal (CSI-RS) measurement configuration for the at least one secondary carrier; and
performing CSI-RS measurements for the first and second secondary carriers according to the CSI-RS measurement configuration,
wherein performing CSI reporting is based on the CSI-RS measurements and the determined CSI reporting configuration.

14. The method of claim 13, wherein performing CSI reporting comprises reporting one or more of channel measurements of the first and second secondary carriers, interference measurements of the first and second secondary carriers, or a combination thereof.

15. An apparatus for wireless communications, comprising:
means for identifying a multiple carrier configuration, the multiple carrier configuration comprising a first carrier group and a second carrier group,
the first carrier group being associated with a first base station and including a primary carrier only or the primary carrier and a first set of secondary carriers, and
the second carrier group being associated with a second base station and including a second set of secondary carriers, wherein one or more secondary carriers of the first set of secondary carriers or the second set of secondary carriers aperiodic ally transition between being dormant and non-dormant;
means for monitoring the one or more secondary carriers for a cell mode indicator indicating that a secondary carrier from at least one of the first set of secondary carriers or the second set of secondary carriers is dormant;
means for determining that a first secondary carrier from at least one of the first set of secondary carriers or the second set of secondary carriers is dormant based on a received cell mode indicator;
means for determining that a second secondary carrier from at least one of the first set of secondary carriers or the second set of secondary carriers is aperiodically dormant based on an absence of detecting information related to dormancy over the one or more secondary carriers during the monitoring; and
means for transmitting a channel feedback report for the one or more secondary carriers while the first and second secondary carriers are dormant, wherein the channel feedback report comprises channel interference feedback that is based on measurements of resources of the one or more secondary carriers while the first and second secondary carriers are dormant and channel quality feedback that is based on channel measurements of the one or more secondary carriers from a previous non-dormant period of the first and second secondary carriers.

16. The apparatus of claim 15, wherein the means for monitoring monitors the one or more secondary carriers from the first carrier group for cell mode indicators associated with the one or more secondary carriers of the first set of secondary carriers.

17. The apparatus of claim 15, wherein
the second carrier group comprises a special secondary carrier, and
wherein the means for monitoring monitors the special secondary carrier for cell mode indicators associated with the one or more secondary carriers of the second set of secondary carriers.

18. The apparatus of claim 15, wherein
the second carrier group comprises a special secondary carrier, and
wherein the means for monitoring monitors the one or more secondary carriers of the second set of secondary carriers for cell mode indicators associated with the one or more secondary carriers of the second set of secondary carriers.

19. The apparatus of claim 15, wherein the means for monitoring monitors one or more search spaces of at least a first carrier of the first carrier group and at least a second carrier of the second carrier group at predefined time intervals for downlink control information (DCI) comprising the indications of cell dormancy.

20. The apparatus of claim 15, wherein the means for monitoring monitors the indications based on activation states of secondary carriers of the first and second sets of secondary carriers.

21. An apparatus for wireless communications, comprising:
means for determining a multiple carrier configuration including a first carrier group and a second carrier group,
the first carrier group being associated with a first base station and including a primary carrier only or the primary carrier and a first set of secondary carriers, and
the second carrier group being associated with a second base station and including a second set of secondary carriers, wherein one or more secondary carriers from the first set of secondary carriers or the second set of secondary carriers aperiodically transitions between being dormant and non-dormant;
means for monitoring the one or more secondary carriers for a cell mode indicator indicating that a secondary carrier from at least one of the first set of secondary carriers or the second set of secondary carriers is dormant;
means for determining that a first secondary carrier from at least one of the first set of secondary carriers or the second set of secondary carriers is dormant based on a received cell mode indicator;
means for determining that a second secondary carrier from at least one of the first set of secondary carriers or the second set of secondary carriers is aperiodically dormant based at least in part on detecting an aperiodic transition between being non-dormant and being dormant from an absence of information related to dormancy for the second secondary carrier;
means for determining a channel state information (CSI) reporting configuration for the first and second secondary carriers based at least in part on the determining that the first and second secondary carriers are dormant; and
means for performing CSI reporting according to the CSI reporting configuration, wherein the CSI reporting configuration comprises a first antenna port configuration for reporting CSI when the first and second secondary carriers are dormant and a second antenna port configuration for reporting CSI when the first and second secondary carriers are non-dormant, the first antenna port configuration being different than the second antenna port configuration.

22. The apparatus of claim 21, wherein the means for performing CSI reporting further comprises:
means for determining whether the first and second secondary carriers are associated with the first base station or the second base station,
and wherein the means for performing CSI reporting performs CSI reporting for the first and second secondary carriers to the first base station or to the second base station based on the determined association and according to the CSI reporting configuration.

23. The apparatus of claim 21, wherein the first type of CSI comprises periodic CSI reporting and the second type of CSI comprises aperiodic CSI reporting.

* * * * *